US008047138B2

(12) United States Patent
Tozoni

(10) Patent No.: US 8,047,138 B2
(45) Date of Patent: Nov. 1, 2011

(54) SELF-REGULATING MAGNETO-DYNAMIC SYSTEM FOR HIGH SPEED GROUND TRANSPORTATION VEHICLE

(76) Inventor: Oleg V. Tozoni, Rockville, MD (US)

(*) Notice: Subject to any disclaimer, the term of this patent is extended or adjusted under 35 U.S.C. 154(b) by 57 days.

(21) Appl. No.: 12/216,552

(22) Filed: Jul. 8, 2008

(65) Prior Publication Data

US 2010/0005997 A1 Jan. 14, 2010

(51) Int. Cl.
*B60L 13/00* (2006.01)
(52) U.S. Cl. ......... 104/283; 104/281; 104/282; 104/284
(58) Field of Classification Search .................. 104/281, 104/282, 283, 284, 286, 290, 292, 293
See application file for complete search history.

(56) References Cited

U.S. PATENT DOCUMENTS

| | | | | |
|---|---|---|---|---|
| 3,834,317 A * | 9/1974 | Miericke | ...................... | 104/286 |
| 5,072,144 A * | 12/1991 | Saito et al. | .................. | 310/12.28 |
| 5,140,208 A * | 8/1992 | Tozoni | ......................... | 310/90.5 |
| 5,208,496 A * | 5/1993 | Tozoni et al. | .............. | 310/12.09 |
| 5,218,257 A * | 6/1993 | Tozoni | .......................... | 310/90.5 |
| 5,225,726 A * | 7/1993 | Tozoni | ....................... | 310/12.09 |
| 5,319,275 A * | 6/1994 | Tozoni | .......................... | 310/90.5 |
| 5,388,527 A * | 2/1995 | Thornton | ....................... | 104/284 |
| 5,652,472 A * | 7/1997 | Tozoni | .......................... | 310/90.5 |
| 5,717,261 A * | 2/1998 | Tozoni | ....................... | 310/12.21 |
| 5,783,878 A * | 7/1998 | Tozoni | ....................... | 310/12.23 |
| 5,980,193 A * | 11/1999 | Clifton et al. | .............. | 414/749.2 |
| 6,286,434 B1 * | 9/2001 | Fischperer | .................... | 104/290 |
| 6,374,746 B1 * | 4/2002 | Fiske | .......................... | 104/138.1 |
| 6,629,503 B2 * | 10/2003 | Post | ............................... | 104/281 |
| 7,185,590 B2 * | 3/2007 | Fu et al. | ......................... | 104/281 |
| 7,654,540 B2 * | 2/2010 | Parison et al. | .................. | 280/5.5 |
| 2009/0205531 A1 * | 8/2009 | Miller et al. | .................. | 104/281 |
| 2010/0005997 A1 * | 1/2010 | Tozoni | .......................... | 104/283 |

* cited by examiner

Primary Examiner — S. Joseph Morano
Assistant Examiner — Jason C Smith

(57) ABSTRACT

A self-regulating magneto-dynamic system, utilizing steel core rails and permanent magnets as sources of magnetic field, provided for magnetic levitation, stabilization and propulsion in a high speed ground transportation vehicle moving with high speed without friction along a track having a predetermined trajectory, comprising of a self-regulating magneto-dynamic levitation and stabilizing system (MDLSS) provided for magnetic levitation and stabilization of the vehicle, and a permanent magnet linear synchronous motor (PMLSM) provided for stable propulsion of the vehicle. Both systems are situated on the same vehicle, interacting with each other only through electro-magnetic process, working synchronously, supporting each other's stability and self-regulation, where the stability of the MDLSS affects the functionality of the PMLSM, and the precise work of the PMLSM allows for more optimum design of the MDLSS.

4 Claims, 13 Drawing Sheets

SELF-REGULATING MAGNETO-DYNAMIC SYSTEM FOR HIGH SPEED GROUND TRANSPORTATION VEHICLE

CROSS-REFERENCE TO RELATED APPLICATION

Non-applicable

STATEMENT REGARDING FEDERALLY SPONSORED RESEARCH OR DEVELOPMENT

Non-applicable

REFERENCE TO SEQUENCE LISTING, A TABLE, OR A COMPUTER PROGRAM LISTING COMPACT DISK APPENDIX

Non-applicable

BACKGROUND OF THE INVENTION

Presented invention pertains to Maglev high speed ground transportation comprising magneto-dynamic suspension and linear synchronous motor both utilizing permanent magnets and steel cores with electro-dynamic processes proceeding in them.

There are two types of existing Maglev transportation systems: Transrapid (Germany) and High Speed Surface Train—HSST (Japan). Their suspension systems differ in the ways of producing internal magnetic forces. Transrapid utilizes Electromagnetic Suspension employing electromagnets attracted to the stator steel rails, and HSST utilizes Electro-dynamic Suspension employing superconductive magnets repelled from conductive plates during vehicle motion. Both types of suspension are not self-regulating.

To perform their working functions the electromagnets of Transrapid suspension must be powered with current sources installed on each car and regulated by a complicated servo control system monitoring the vehicle deviations from its track. As a result, any malfunction in the servo control system may lead to a disaster. Utilizing superconductive magnets for electro-dynamic suspension is not appropriate for HSST or any other high speed public transportation as they present a health hazard for passengers. This bulky, and fragile device is incapable of tolerating large mechanical loads. Moreover, it requires permanent sophisticated helium cooling system that is explosion-hazardous.

In both existing Maglev systems propulsion force is produced by linear synchronous motor with stator winding uniformly distributed along a guideway. Therefore propulsion force as well as vehicle speed are regulated by frequency and value of current. This requires sophisticated equipment, comprising converters from conventional system of AC of constant frequency into DC and invertors from DC into AC of alternating frequency for regulating the vehicle speed. Therefore the linear synchronous motors are also not self-regulating.

As a result the solutions found for the existing versions of Maglev for performing their working functions are palliative since they relayed on servo control systems thus making passengers' lives dependent on the control systems reliability. This has been delaying commercial utilizing of Maglev for public transportation. Current versions have been developing for more than 40 years and require full-scale modeling for their development.

The proposed new type of Maglev-Amlev system—utilizes magneto-dynamic suspension and linear synchronous motor—both employing permanent magnets and steel cores.

For a long time numerous attempts to create high-speed ground transportation without friction (a flying car suspended by its permanent magnets to steel cores placed along designed trajectory) had been unsuccessful and gave reason to believe that stable flight of a car on a passive suspension is impossible. It is shown in the detailed description of the invention that this belief is erroneous because the following has not been taken into account:

a) the magnets can be of alternating polarity and move along stable laminated steel cores of the stator;
b) magnetic permeability of steel decreases as intensity of magnetic field in it grows;
c) laminated steel of cores eliminates electric component of running electromagnetic wave thus converting it into running magnetic wave;
d) a flat screen of non-magnetic metal (aluminum) becomes an insulator for leakage alternating magnetic fluxes from laminated cores (following Lenz principle of electro-magnetic inertia).

Above features allowed creating a design of self-regulating stable passive magnetic suspension for moving car (MDLSS) and self-regulating linear synchronous motor, based on permanent magnets and steel cores (PMLSM), that is fed by three-phase current of constant frequency (FIGS. 1, 2, 3). Moreover the design was based on precise analytical calculation and measuring internal stabilizing and destabilizing forces on a desk-top model.

The possibility of creating a stable suspension system was proven more than two centuries ago and supported by the Lagrange-Dirichlet theorem. Applied to our case it states that equilibrium of a MDLSS levitator is stable if potential energy of the MDLSS magnetic field has its local minimum in the equilibrium position.

Magnetic suspension utilizing permanent magnets, steel cores and rigid constrains is a conservative system, i.e. one that conserves its potential magnetic energy $E_p$. Potential magnetic energy is that part of energy that cannot be transformed into kinetic energy because of rigid constrains. Two parts of MDLSS: stator and levitator—are separated in space, interacting with each other through magnetic field. Internal forces in a conservative system are derivatives of the potential magnetic energy $E_p$ with respect to coordinates of a shift between its parts. Permeability of steel parts of the MDLSS is very dependable on the intensity of the field. This peculiarity of saturated steel makes it possible to build a stable MDLSS based on the permanent magnets and steel cores. The deduction method was applied to the Lagrange-Dirichlet theorem that in our case states that position of MDLSS levitator magnets is stable if potential energy $E_p$ of magnetic field produced by permanent magnets has a local minimum $E_{pm}$, not coinciding with a cores surface. It is impossible to reveal or to measure potential energy of magnetic field. Therefore, it is expedient to proceed from the opposite premise: if MDLSS levitator is in equilibrium position, and any its small shift produces a stabilizing force then MDLSS is stable. Such interpretation of Lagrange-Dirchlet theorem prompts the way of creating a stable MDLSS.

It was shown in [1], [3] and [4] how to create a self-regulating magneto-dynamic system (MDLSS)—a vehicle with permanent magnets affixed to its floor and sides, which flies stably along the stator steel laminated cores.

The design of a self-regulating linear synchronous motor (PMLSM) with screening permanent magnet rotor having extendible poles which has a winding powered by three-phase current of constant frequency versus varying frequency of the existing types of Maglev. It has been achieved due to non-uniform distribution of the stator winding along the guideway. The stator turn length is proportional to the vehicle speed. Such design does not have complicated devices for regulating. The PMLSM is stable (never falls out synchronism), and self-regulating. It was presented in [2] and [5].

The following additions and changes are given in this application:
1) Assembly of MDLSS and PMLSM in the common transportation system—Amlev;
2) Remodeled design of MDLSS and its parts;
3) Remodeled design of PMLSM and its parts;
4) Complete description of the physical processes during Amlev vehicle motion;
5) Design of a small (desk top) model that helps to obtain optimal shapes and dimensions of all the parts of MDLSS producing magnetic forces applied to the car which will ensure stability and safety of its flight.

BRIEF SUMMARY OF THE INVENTION

The proposed Amlev (American type of Maglev) Self-Regulating System of High Speed Ground Transportation Based on Permanent Magnets and Steel Cores is designated for magnetic levitation, stabilization, and propulsion of vehicles moving with high speed without friction.

The proposed system comprises two functionally connected and interacting with each other subsystems: (a) a Magneto-Dynamic Levitation and Stabilizing Self-Regulating System (MDLSS), and (b) a Permanent Magnet Linear Synchronous Motor (PMLSM). Both systems comprise permanent magnets and steel cores.

MDLSS provides levitation and stabilization of vehicle suspended in magnetic field produced by its own permanent magnets while PMLSM produces propulsion force providing the assigned alternative velocity of the vehicle along preliminary designated trajectory of the guideway by interaction of the magnetic field of the vehicle magnets with current traveling wave in the stator winding powered by the current of constant frequency 50 Hz.

Each of said subsystems comprises two main parts: a fixed part—guideway/stator (which is common for both subsystems) including extended steel cores for MDLSS and extended three-phase windings for PMLSM, and moving part—permanent magnets of the levitator for MDLSS and permanent magnets with the steel cores of the rotor for PMLSM—all affixed to the moving vehicle. Each of the subsystems is self-regulating and operates without fast response control system.

A new small (desk-top) rotation model is proposed for measuring destabilizing forces impacting a flying vehicle at its shifts from an assigned trajectory that allows to eliminate the stage of full-scale modeling when designing Amlev system.

DETAILED DESCRIPTION OF THE INVENTION

Amlev is a new type of Maglev, its peculiarities
Two unsolved problems caused delay in commercial utilization of Maglev. These are how to ensure: stable flight of a vehicle, and stable work of a linear motor.

The new invention relates to a new type of Maglev presented here. It is called Amlev (american version of Maglev). Amlev is high speedground transportation system that ensures stable flight of a vehicle providing its maximum speed—150 m/s while its linear motor power reduced by 2.5 times as compared to PMLSM presented in [2] and [5], at improved suspension system as compared to MDLSS presented in [1], [3] and [4] and the weight of loaded vehicle reduced up to 10t.

Figure 1:
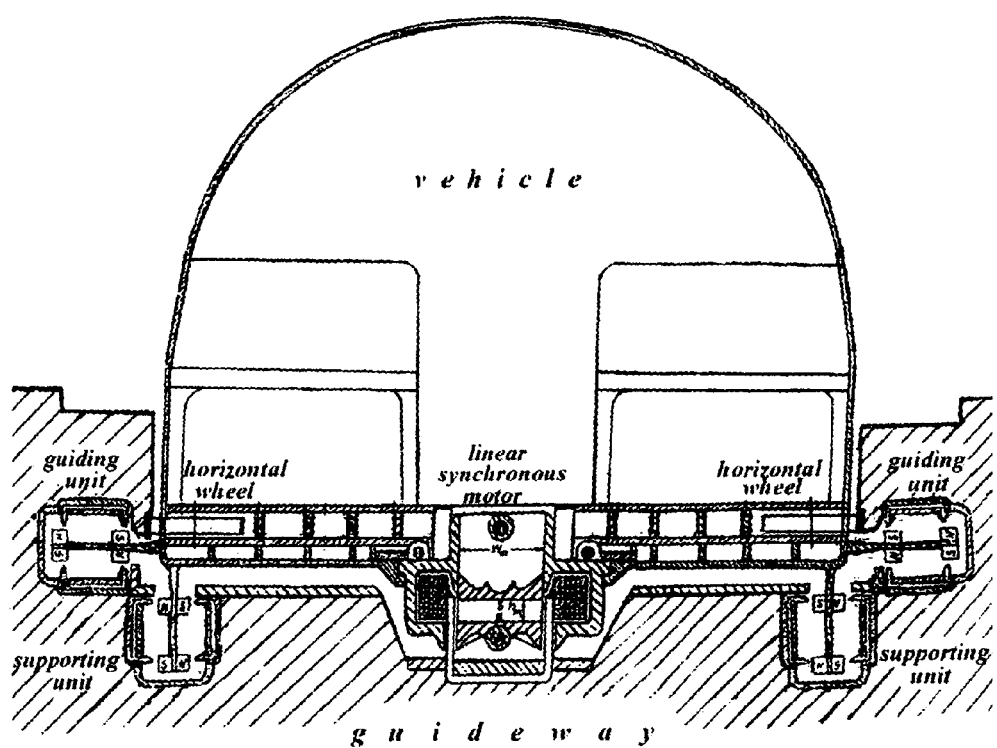
FIG. 1 General view of Amlev vehicle: its cross-section by symmetry plane YOZ,
FIG. 2 Upper view of the front half of Amlev vehicle.
Figure 2:
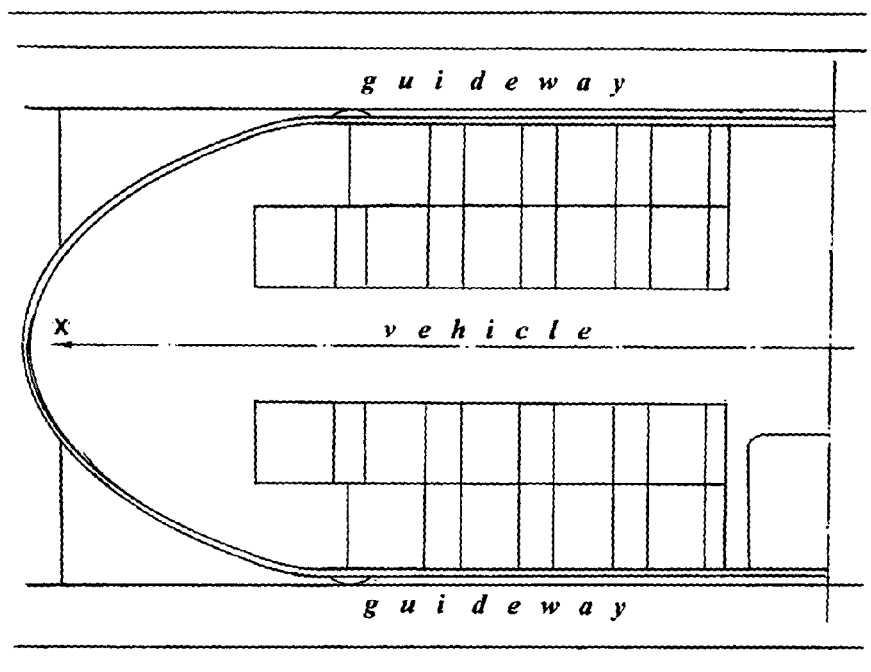
Figure 3:
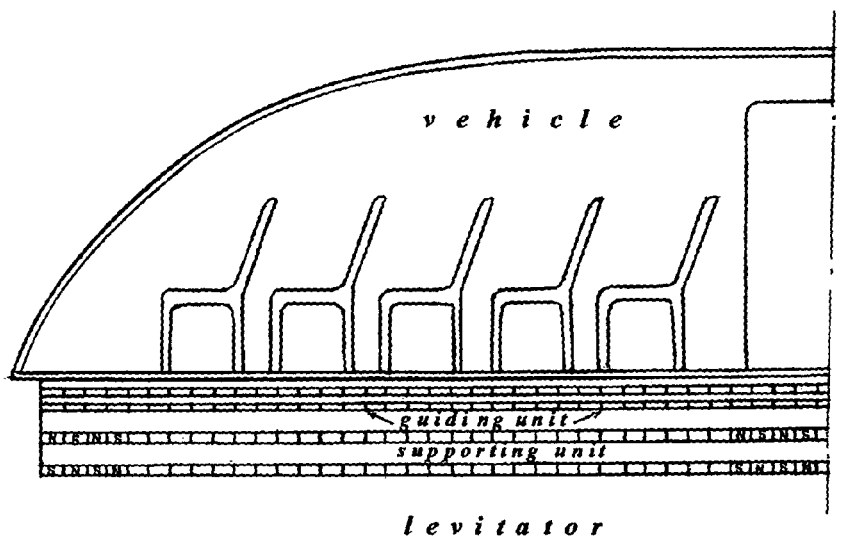
FIG. 3 Side view of the front half of Amlev vehicle
FIG. 4 Paraboloids of potential energy
FIG. 5 Cross-sectional view of a unit
FIG. 6 Perspective view of a unit and a quadrupole FIG. 7 Two identical units connected by non-magnetic constrains with reciprocally-perpendicular axes of symmetry
FIG. 8 The equivalent magnetic circuit of a unit
FIG. 9 DC magnetization curve for M-5 grain-oriented electrical steel of 0.012" (0.3 mm) in thick
FIG. 10 Graph of relative magnetic permeability $\mu_f(B_f)$ of electrical steel and its specific magnetic reluctance $\rho_f(B_f)$ as a function of magnetic flux density
FIG. 11 Top- and side-view of moving levitator steel strip with two rows of permanent magnets situated at ifs both sides
FIG. 12 Cross-sectional view of an assembled guiding unit in plane YOZ perpendicular to Axis X
FIG. 13 Cross-sectional view of an assembled supporting unit in plane ZOY perpendicular to Axis X
FIG. 14 Cross-sectional view of laminated steel core sheets with eddy current closed contours performed in large scale (30:1)
FIG. 15 Cross-sectional view of three-layer medium containing two flat aluminum screens
FIG. 16 Cutaway view of half of permanent magnet linear motor
FIG. 17 Cross-sectional view of PMLM magnetic units: (a) central unit, (b) operating unit, (c) non-operating unit
FIG. 18 Fragment of PMLM rotor and stator winding: (a) Longitudinal cross-section of the right-hand half of PMLM and stator winding; (b) view from above of PMLM central part
FIG. 19 A perspective view of a fragment of stator winding section: at maximum vehicle speed 150 m/s; (b) at vehicle speed 30 m/s
FIG. 20 Scheme of winding turns fitting in the length of traveling wave $\lambda(V)$. Dimensions in [m] correspond to maximal velocity of the traveling wave $V_m$=150 m/s
FIG. 21 Space distribution of currents in traverse segments of stator's winding conductors at two different moments: (a) $t_1$=90°; (b) $t_2$=$t_1$+30°; (c) disposition of rotor magnet with respect to a current wave traveling with speed 150 m/s
FIG. 22 Unrolled scheme of a stator winding fragment powered by its own step-down transformer
FIG. 23 A desk-top model for measuring forces $F_d$ and $F_s$ acting on a flying vehicle at its shifts from an assigned trajectory (side and top views):
1. stationary outer steel ring with permanent magnets;
2. permanent magnets of alternating polarity;
3. air gap;
4. laminated core tips;
5. external aluminum screen (made in form of a ring);
6. saturated levitator laminated core backs;
7. aluminum wheel put on the rotor shaft and consisting of two halves fixed by screws:
8. motor with a regulator of rotary speed.

Amlev is based on rare-earth permanent magnets and steel cores connected by rigid constrains and utilizes the most intensive way of producing magnetic forces directly performing all working functions. All parts of Amlev are essentially distinguished from the existing types of Maglev: its Magnetic suspension and Propulsion motor subsystems are self-regulating, and its Power system is three-phased synosoidal current of constant frequency 50 Hz. General view of Amlev vehicle: its cross-sectional view, plane- and side-views of its half are shown in FIGS. 1, 2, 3 respectively.

As was said in [4] Amlev comprises three parts:

Magneto-dynamic levitation and stabilizing self-regulating system—MDLSS

Linear synchronous motor based on permanent magnets—PMLSM

Conventional power system at constant frequency 50 Hz.

The sources of magnetic field are rare-earth permanent magnets Crumax 355 and steel cores. Below we will consider each part separately.

As was said above, MDLSS provides levitation and stabilization of the vehicle suspended in magnetic field produced by its own permanent magnets. It reacts on any external forces impacting a vehicle that move it from the assigned trajectory by instantaneously producing internal magnetic forces that return it back to the trajectoty. It was also said that PMLSM produces propulsion force providing the assigned alternative velocity of the vehicle along the designated trajectory of the guideway by interaction of the magnetic field of the vehicle magnets with the current traveling wave in the stator winding powered by the current of constant frequency.

The most unusual peculiarity of Amlev is its self-regulation, i.e., instant counteraction to:

any deviation of flying vehicle from its set trajectory;

any departure of vehicle speed from the given value at any point of its flight trajectory.

This peculiarity is assured by electromagnetic processes proceeding in MDLSS and PMLSM. It was said in [1] and [2] that PMLSM speed is proportional to turn length of its stator winding. By calculating in advance permissible speed of the vehicle at all segments of its trajectory, it's easy to determine the lengths of all stator winding turns and thus incorporate an accurate program of flight velocity at all track segments right into Amlev design.

Amlev subsystems MDLSS and PMLSM work as an assembly. While in Transrapid (Germany) and HSST (Japan) Suspension and Linear motor are connected by very sophisticated system of control and radio signals (converters from AC of constant frequency into DC and converters from DC into AC of alternating frequency and so on), in the Amlev assembly the MDLSS and PMLSM interact with each other only through velocity of the vehicle produced by PMLSM.

The magnets of both the PMLSM and MDLSS are installed on the same vehicle. Since the vehicular speed depends on the PMLSM stator winding turn length and is set beforehand at each point of its trajectory, the PMLSM speed affects electromagnetic processes in the MDLSS, and those in turn ensure stable flight of the vehicle all over the trajectory.

The system of powering stator winding is conventional. It is simple (does not require inverters and converters), inexpensive, and reliable. The stator winding is powered by three-phased sinusoidal current of constant frequency 50 Hz at the whole trajectory besides start segments in vicinity of stop stations, where the vehicular speed less than 25 m/s. At the start segments stator winding length of the trajectory is constant and equals 0.25 m. Low-power electronic generators of 10 Kwt of variable frequency 0-50 Hz accelerates vehicle speed up to 25 m/s at the start segments. When the vehicle approaches the end of a start segment an automatic synchronizer put into operation providing concurrency of currents in start segment and conventional power system that eliminates PMLSM falling out synchronism. At the moment when the vehicular speed reaches 25 m/s the linear synchronous motor winding starts getting power from conventional power system and becomes self-regulating ensuring assigned velocity at each point of the trajectory.

Meanwhile Amlev's MDLSS starts working ensuring stability of vehicle flight as early as its speed reaches 15 m/s. It will be explained later that the stable flight of the vehicle becomes possible due to attaining minimum of potential magnetic energy of MDLSS system.

Each car of Amlev is also self-regulating. It has its own permanent magnet motor and its own suspension. The stator winding turn length and the value of running current varies from one trajectory segment to another. Therefore there is no sense and even impossible to join the cars into a train as it is customary in the existing types of Maglev. A capacity of a car is 30-36 passengers and the cars may be launched from a stop station one by one every 3-5 minutes. In this case the load of the power system is uniform, the departure schedule is flexible, the time interval between to adjacent vehicles is constant. Therefore collision of the adjacent vehicles is impossible.

It is worthwhile to point out here that unlike with existing versions of Maglev requiring long-term full-scale modeling, this stage is completely eliminated from the process of Amlev design. The modeling stage is maximally simplified and accelerated due to analytical calculation, mathematical modeling on computer and possibility to build a small (desk-top) model for measuring destabilizing forces impacting a flying vehicle at its shifts from an assigned trajectory.

Amlev Advantages

The potential energy of the magnetic field produced by the MDLSS system has a strict local minimum along the entire guideway length. Therefore, any shift from the set trajectory of Amlev vehicle flying with the speed V>15 m/s causes stabilizing forces tending to bring it back to its track. As a consequence Amlev has undisputable advantages:

1. Self-Regulation.

Both MDLSS and PLMSM are self-regulating: MDLSS eliminates any deviation of the vehicle from assigned trajectory, PLMSM provides assigned velocity at any point of the trajectory.

2. Safety.

a) Failure of any auxiliary system in either guideway or vehicle, (such as power system, automatic control system, etc.) cannot lead to collapse;

b) At any shutdown a vehicle will continue its flight, gradually lowering its speed to the value $V_0$ when the air resistance and horizontal supporting wheels stop it; Magnetic fields of permanent magnets are closed by iron cores and never cause any harm to passengers;

c) Because of time interval between to adjacent vehicles is constant collision of the adjacent vehicles is impossible.

3. Simple Construction and Light Weight of the Vehicle.

4. Exploitation of permanent magnets.

a) Permanent magnets are significantly less expensive in both manufacture and operation; can be made of any size and shape; do not loose their magnetization and levitation ability over time.

b) They do not require current; super cooling; a fast-response control system and heavy, bulky source of energy placed inside a vehicle.

5. Flexible trajectory.
   Because of vehicle speed is determined by preliminary design of stator winding, and MDLSS is self-regulating, its track admits radiuses of curves compatible with existing highways and railway.
6. Conventional power system.
   Because the frequency of current powering stator winding is 50 Hz the conventional power system may be utilized.
7. The uniform load of power system
   Launching of vehicles from their stop-stations with equal intervals ensures uniform load of power system.
8. Flexible departure schedule (every 3-5 minutes)
9. Elimination of full-scale modeling The modeling process is maximally simplified and accelerated due to analytical calculations, mathematical modeling on a computer and possibility of building a desk-top rotation model.

Magneto-Dynamic Levitation and Stabilizing Self-Regulating System—MDLSS, its General Design As it was said above, MDLSS was described in [1], [3] and [4]. Here we present a new design that allows to attain minimum of potential energy of the system. i.e., to suppress completely destabilizing forces and achieve stable hovering of the vehicle in its own field in such a way that any shift of the vehicle caused by external forces instantly leads to arisng counter-directed stabilizing forces bringing the vehicle to equilibrium. Design of the MDLSS units was also modified and simplified. Here we present modified design of MDLSS, theorethical basis of its design, conditions of its stability, calculation of internal forces and leakage fluxes.

General design of MDLSS is presented in FIGS. 1, 2. 3. Design of a separate units is presented in FIGS. 12 and 13. MDLSS comprises: (a) immobile part—stator; (b) mobile part—levitator.

Levitator and stator are connected with each other by magnetic forces only and are designated to ensure stable flight of the vehicle suspended in its own magnetic field between stator steel cores in such way that any shift of the vehicle caused by external forces instantly leads to arising counter-directed stabilizing forces bringing the vehicle to its trajectory.

Figure 5:
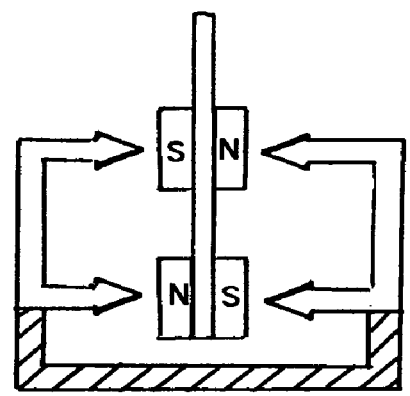
Figure 6:
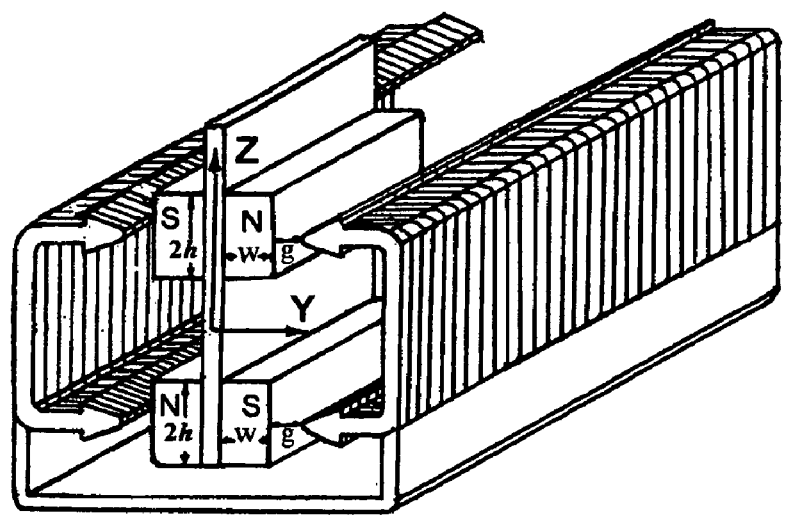

The vehicle levitator consists of two vertical and two horizontal steel strips, all firmly attached to the walls and floor of the vehicle. Rare-earth permanent magnets (Crumax 355) of rectangular shape and alternating polarity are attached along each side of the strips (FIGS. 1, 5 and 6). The length of each of these magnets (along the strip) $l_m \approx 0.1$ m, their width (across the strip) is $2h=0.04$ m, thickness $w=0.027$ m. These four strips with magnets rigidly connected to each other and to the vehicle and moving together with the vehicle constitute a levitator assembly.

The stator of MDLSS consists of four pairs of C-shaped steel laminated cores made of M-5 grain-oriented electrical steel, 0.3 mm thick with high core backs and short core tips and extended along the entire track. The stator core backs are covered with aluminum screens along their inner and outer surfaces. The cores are situated inside concrete trenches of guideway (FIGS. 1, 5 and 6).

Theoretical Basis of MDLSS Design

As it was said above, for almost 100 years building a stable MDLSS was considered impossible. To prove the opposite let us see into the essentials of MDLSS. We will note one peculiarity of the Lagrange-Dirichlet theorem.

The levitator magnets are fixed rigidly on the Amlev vehicle and together with it form a solid body of cylindrical shape. Thus rigid constrains assemble the levitator into a solid body. As a result: (a) a shift $\delta$ of any point of the levitator causes the same shifts of the rest of its points; (b) the levitator summarizes all forces applied to it in total equivalent force. When proving Lagrange-Dirichlet theorem these peculiarities of a solid body (in our case, levitator) were considered: a real-conservative system comprising bodies of different configurations was substituted by a system of mass points. In theoretical mechanic, this procedure is called "transition into space of configuration". By this approach, the real distribution of forces acting on each body is substituted by an equivalent force. Therefore, in order to employ Lagrange-Dirichlet theorem for creating a stable suspension of real bodies of definite shapes, the equivalent force must be expanded into components in such a way to satisfy all necessary equations for static body equilibrium. Speaking of Amlev system, we must ensure stable equilibrium of two bodies only: an immobile stator and a flying vehicle with a levitator. To attain this it is necessary to situate levitator magnets and stator steel cores in a specific manner.

Interaction between the levitator magnets and stator steel cores produces stabilizing forces. To give the flying vehicle maximum stability the torques of these forces must be as big as possible. It is known that a torque of the couple of forces is proportional to a distance between these forces. Therefore, the magnets must be fixed to the bottom and walls along the whole vehicle close to its walls. Correspondingly, the stator cores must be located along the guideway and be parallel to flying magnets at a small distance from them. The stator cores together with two sets of magnets located in series on each side of the vehicle are designated for producing stabilizing forces. In this case, the shapes of both MDLSS magnets and cores must be cylindrical with their generatrices parallel to the Axis OX of the guideway. Hence the vehicle has just one degree of freedom directed along the Axis OX. The other shifts and turns should produce stabilizing forces and torques.

Magnetic fluxes enter laminated cores through core tips. The width of cores backs should be such that with no dissipation from the backs induction in them would be $B > 1.7$ T (FIG. 10) and would fall within linear segment of the curve $\rho_f$ ($B_f$). When the vehicle is not moving, permanent magnetic fluxes entering the tips also partially enter the cores and by saturating them create dissipation fluxes which close through aluminum screen and air gaps. When vehicle moves, alternating magnetic filed penetrates immobile cores. Field frequency f increases proportionally to vehicle speed V. At the same time alternating dissipation fluxes generate alternating eddy currents in the screens. Magnetic fluxes of these currents are directed opposite to dissipation fluxes and, as the speed and frequency increase, almost compensate them. Leakage fluxes disappear and induction in laminated steel reaches the value bigger than 1.7 T. Magnetic resistance of left and right cores increases rapidly. If both left and right tips have a shape of a hyperbola in their cross-section, one can analytically calculate the values for induction B and magnetic flux $\Psi$ that enters the tips, by using the method of conformal mapping [7,9], and then the forces that are acting upon the tips can also be calculated.

In order to make MDLSS stable the interaction between the levitator magnets and the stator steel cores must produce stabilizing forces only. Next, it will be shown how to attain this.

It is known that a permanent magnet is always attracted to a steel body, i.e. it produces a destabilized force $F_d$, tending to increase its shift. This force is oriented contrarily to a stabilizing force $F_s$. Let us think what configuration a steel body must have to make a rectangular magnets to produce stabilizing forces in its vicinity. FIG. 5 shows magnets with their poles situated symmetrically between tips of a C-shaped steel cores. The destabilizing forces of attraction of the magnets to both the right and left core tips are balanced and only a vertical stabilizing force $F_s$ acts on the magnets opposing their vertical shift. When the magnet is shifted downwards it stretches Faraday's pipes of magnetic flux (similar to an arrow stretching a bowstring) thus producing the stabilizing force $F_s$ that tends to bring it back to the initial position. Therefore, it will be logical to build MDLSS of rectangular magnets assembled into a levitator and C-shaped steel cores assembled into a stator. This is the first step toward creating a stable suspension based on permanent magnets.

Derivative of $E_p$ (system potential energy) with respect to levitator shift δ equals magnetic force $$F = -\frac{\partial E_p}{\partial \delta},$$

directed to $E_p$ lessening. Therefore in the vicinity of equilibrium, where potential energy is minimum $E_p=E_{pm}$, forces of interaction between levitator magnets and the stator cores must be stabilizing. It follows from the above that speaking of the real Amlev system minimum of potential energy we mean that it must be achieved simultaneously in the entire volume of the levitator-vehicle assembly in the regular three-dimensional space or (that is the same) just in one massive point Q of the space of configuration.

Let us assume that design of MDLSS ensures local minimum of potential energy $E_{pm}$. It means that when the levitator is in the position corresponding to minimum of potential energy (point Q in FIG. 4) then the sum of all forces applying to it is zero, i.e., the levitator is in equilibrium. However, each magnet produces its own force. Consequently, equilibrium is a result of action of counter forces balancing each other. Hence, we come to the following conclusions:
(a) the situation of magnets and steel cores in MDLSS must be mirror-symmetrical (FIG. 5);
(b) the force produced at magnets shift δ from the equilibrium should be stabilizing opposing the shift.

If to expand this force in Maclaurin's series it can be expressed by $$F_s(\delta) \approx -\frac{\partial F_s}{\partial \delta} \cdot \delta = -F'_s \cdot \delta \tag{1}$$

where $F'_s$ is stiffness of the stabilizing force

One can see from formula (1) that value of stabilizing force $F_s$ is proportional to the product of shift δ and value of its stiffness $F'_s$. The less the volume of magnetic field of energy $E_p$ in the air gap g (FIG. 6) between the levitator and stator comparing to $g^2$ the bigger the stiffness. Since magnetic field in MDLSS system is produced by extended magnets of the levitator, flying along the stator cores it can be considered plane-parallel and calculations of its parameters are performed per one meter of vehicle length.

As distinguished from any regular function, that has a minimum just in a single point, in our case the potential energy of MDLSS has a minimum in the whole volume of the levitator body with the stabilizing force as a function of the shift having the same value and direction in all the points. Therefore the levitator-vehicle assembly may be substituted by a massive point Q (FIG. 4) coinciding with equilibrium (as if we have compressed the real body in a single point Q). At this approach function of potential energy in the vicinity of Q looks like regular function of two variables (y, z).

Considering this peculiarity of a solid body we can determine whether or not the MDLSS possesses a minimum or maximum of potential energy.

When the levitator is in stable equilibrium, the resulting stabilizing force $F_s$ equals zero. Therefore in close vicinity [δ] of the equilibrium it can be expanded in Maclaurins' series and expressed by:

$$\frac{\partial E_p}{\partial \delta} = F_s(\delta) \approx -\frac{\partial F_s}{\partial \delta} \times \delta = -F'_s(0) \times \delta \tag{2}$$

where $$\frac{\partial F_s}{\partial \delta} \times \delta$$

is a dominant term of the series.

It is possible to find out if MDLSS has a minimum of potential energy. All the MDLSS stator parts are rigidly connected with each other and form an immobile solid body. The levitator magnets are affixed rigidly to a vehicle and together form a mobile solid body. Considering above peculiarity of a solid body first we will determine whether the MDLSS possesses an extreme of potential energy.

Figure 4:
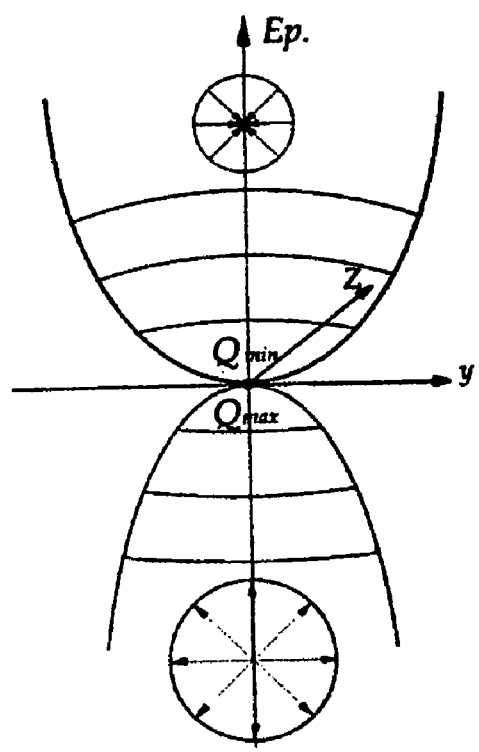

By integrating formula (2) with respect to the shift δ we obtain $$E_p(\delta) = F'_s(0) \int_0^\delta \delta \cdot d\delta = 0.5 F'_s(0) \times \delta^2, \tag{3}$$

that is the equation of a parabola. Hence, the distribution of $E_p(y,z)$ in a small vicinity of the point Q is similar to a parabola surface (FIG. 4).

We will show that it is possible to ensure extreme of potential energy $E_p(y,z)$ in the entire volume of moving levitator by varying its shape, physical characteristics of substance, and position of the levitator and stator parts with respect to each other.

Conditions of MDLSS Stability

Following the Lagrange-Dirichlet theorem, we are searching for a stable system only among those that have equilibrium. Next we will consider the magnetic devices having an equilibrium position and analyze if they posses an extreme of potential energy. We will build a magnetic unit (FIG. 5) where:

1. four levitator magnets together with a steel insert between each pair of magnets are assembled in a quadrupole;
2. two C-shape cores are assembled into a stator by connecting them with a rigid non-magnetic constrain and then situating it mirror-symmetrically with respect to the quadrupole.

Figure 7:
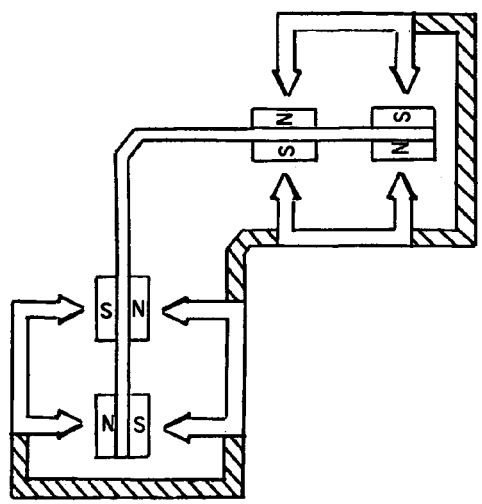

Then two identical units (FIG. 5) connected by non-magnetic constrains with reciprocally-perpendicular axes of symmetry (FIG. 7). In this case, vertical shift $\delta_v$ downward of both quadrupoles from their equilibrium produces a contrarily directed stabilizing force —$F_s$ in the lower unit. However, the same shift produces a destabilizing force $F_d$ in the upper unit. Rigid constrain between the magnets summarizes the forces geometrically. The resulting force is $F_\Sigma = F_d - F_s$. It may be either destabilizing (if $F_d > F_s$) or stabilizing ($F_s > F_d$).

Shift $\delta_\alpha$ of the magnets by any angle $\alpha$ (in the plane of FIG. 7) produces both destabilizing and stabilizing forces in each unit that are proportional to projections of the shift on Axes Y and Z. Summarizing geometrically each pair of stabilizing forces and each pair of destabilizing forces separately we obtain:

$$F_{s\alpha}(\delta) \approx \frac{\partial F_s}{\partial \delta} \cdot \delta \cdot f(\alpha) = -F_s, \quad (4)$$

$$F_{d\alpha}(\delta) \approx \frac{\partial F_d}{\partial \delta} \cdot \delta \cdot f(\alpha) = F_d \quad (5)$$

where $$f(\alpha) = (\cos^2\alpha + \sin^2\alpha)^{1/2} = 1.$$

One can see from ((4) and (5) that both kind of forces are directed along the radiuses $\delta$ of the circle drawn around the equilibrium Q in plain YQZ and do not change their values no matter how the angle $\alpha$ changes. Depending on which one is bigger we can judge whether the system of two units has maximum or minimum of its potential energy.

Hence we make the conclusion: the assembly shown in FIG. 7 proved that its potential energy may have a local extreme. This is the second step towards achieving stable suspension.

As a rule the destabilizing force in such a device is bigger than stabilizing. It means that it has a maximum of potential energy and therefore is not stable.

Regardless of the fact that above magnetic device is unstable, its consideration was beneficiary because it provided us a clue what direction we should keep on in our research. It means that in order to make this device stable we should assemble units in such a way to satisfy inequality $F_s > F_d$ in each of them. Substituting (4) and (5) in this inequality we obtain the condition of stability:

$$\frac{\partial F_s}{\partial \delta} > \frac{\partial F_d}{\partial \delta} \quad (6)$$

Conclusions:
(a) a stable magnetic device must be build of two reciprocally perpendicular units;
(b) stiffness of the stabilizing force in each unit must exceed the stiffness of the destabilizing force.

Considering inequality (6), we can see that little can be done to increase its left part because this leads to proportional increase of its right part respectively. However, it is possible to reduce its right part without changing the left part. Let us show how to achieve this in the MDLSS.

Design of the MDLSS Unit

Configuration of MDLSS units was changed and simplified as compared to [1], [3], [4].

As stated above, during vehicle motion levitator magnets fly between immobile stator core tips and together they constitute four working units: two horizontal (guiding) and two vertical (supporting) units. The guiding units are situated on both walls of the vehicle providing its lateral stability. Supporting units are situated at both sides of the floor of the vehicle providing its vertical stability and also compensate vehicle weight.

Stabilizing forces produced in horizontal and vertical units at their joint operation provide stable hovering and flight of the vehicle along pre-determined trajectory when its equilibrium position has been violated.

Figure 12:
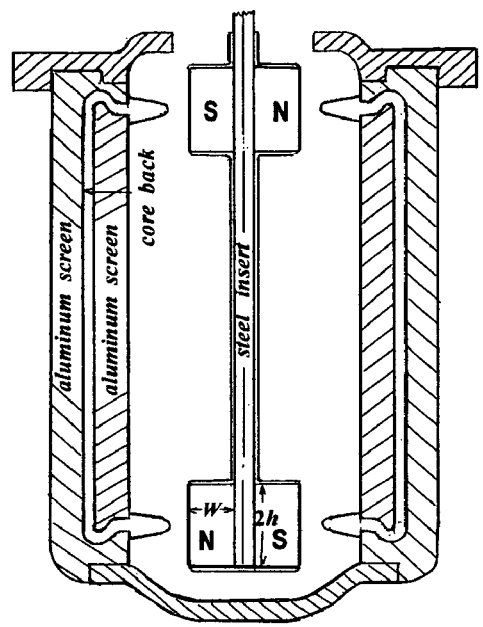
Figure 13:
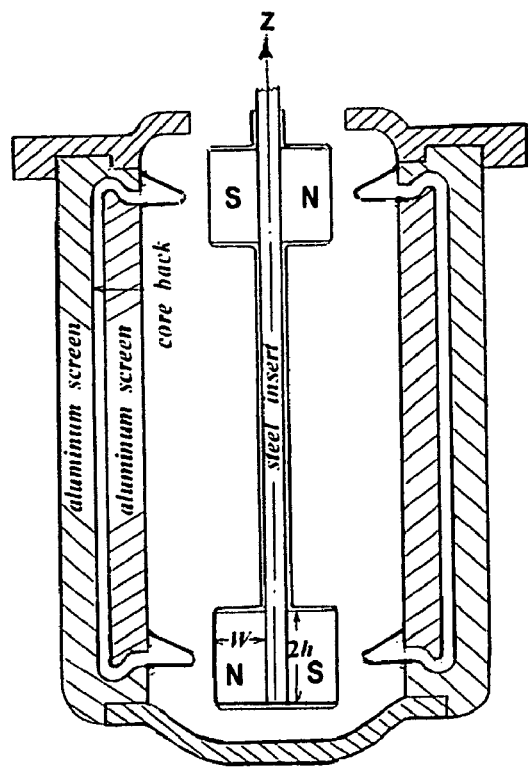

Designs of horizontal and vertical units differ from each other by cross-sectional profiles of their core tips. Cross-sections of both top and bottom core tips of horizontal unit have profile in the shape of hyperbola, while those of vertical unit have profile in the shape of an upper part of hyperbola. Such profile of the vertical unit improves compensation of vehicle weight while the profile of the horizontal unit improves compensation of all the rest external forces such as centrifugal forces on trajectory curvatures and lateral forces of wind (FIGS. 12 and 13).

The idea to apply saturated steel to lessen the right side of inequality (2-6) allows solving this problem. Now we will describe this in detail.

To employ saturation of steel C-shaped cores for reducing destabilizing forces we consider a magnetic unit (FIG. 5). It has four magnets assembled into the quadrupole with the steel insert between each pair of the magnets and the magnets are situated between core tips of two mirror-symmetrical C-shaped steel cores rigidly connected with each other. The insert serves for splitting the magnetic circuit in two independent contours with each containing a steel core and two magnets. Saturating a steel core backs we make its reluctance non-linear.

It is known that non-linearity employed in electric circuits is common used in electro-radio-, and computer technology for stabilization. We will utilize non-linearity in magnetic circuit for lessening the destabilizing force $F_d$ at a horizontal shift $\delta_h$ of the quadrupole.

Figure 8:
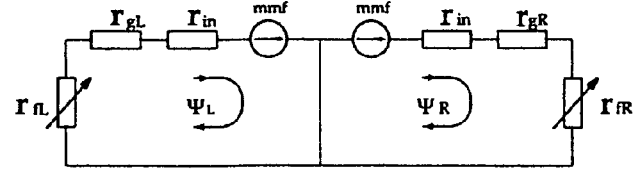

Let us consider the magnetic circuit of the unit (FIG. 8). It consists of two independent left-hand and right-hand flux contours. At shifts $\delta_h$ of the quadrupole the fluxes in both counters are different. The differences in fluxes get into the insert. Therefore the quadrupole's insert is always unsaturated and its magnetic reluctance is zero. Now we will show how to make core back magnetic reluctances non-linear.

Employing magnetization curve $B_f(H_f)$ (FIG. 9) for cores made of M5 grain-oriented electrical steel 0.012 in thick [11] we can build dependencies of relative permeability $\mu_f$ and specific magnetic reluctance $\rho_f$ on induction in the core $B_f$ for the fragment of the curve where steel is saturated (FIG. 10):

$$\mu_f(B_f) = \frac{B_f}{\mu_0 H_f}$$

and $$\rho_f(B_f) = \frac{\mu_0 H_f}{B_f}.$$

One can see from curve $\rho_f(B_f)$ that at $B_f > 2$ T magnetic reluctance of the core increases rapidly with the growth of $B_f$ approaching inclined straight line described by equation $$\rho_f(B_f) \approx \frac{B_f - B_s}{N}, \quad (7)$$

where $B_s$ and $N$ are constants.

This peculiarity can be employed for analytical calculation of magnetic fluxes and forces in the unit. However there is a leakage magnetic flux from the lateral surfaces of the corebacks when they are saturated because of there are no natural magnetic insulating materials for a constant magnetic flux similar to those for electric current. Therefore, it is difficult to employ non-linearity in magnetic circuits.

Let us assume that lateral surfaces of the cores are covered with a layer of magnetic insulation and there is no leakage flux. Then by varying dimensions of the magnets and core back in the unit at symmetrical position of the quadrupole we can obtain induction $B_f^0$ in core back cross-section equaled to its value in the middle of the linear fragment of the inclined straight line of FIG. 10

$$\rho_f(B_f^0) \approx \frac{B_f^0 - B_s}{N},$$

where $$B_f^0 \approx 2.06T \text{ and } \rho_f \approx 0.0325 \frac{A \cdot m}{V \cdot s}.$$

Such properties are found in cheap carbonated steel brands. Both cores and their tips should be manufactured of 0.5 mm thick sheets of such steel.

In this case if quadrupole shifts to the right then the right-hand gap reduces, the flux in the right-hand core grows up thus increasing induction in there. But as a result its non-linear magnetic reluctance grows as well and thus restricts the growth of the attraction force at the right side. At the same time the left-hand gap increases, reducing its magnetic reluctance and thus restricting decrease of the attraction force at the left side. Therefore the difference between the right and left attraction forces (destabilizing force $F_d$) falls abruptly. Thus saturation stabilizes the difference of fluxes and forces. In addition the value of stabilizing force depends on the shape of unsaturated core tips. Hence there is necessary to find their optimum profile.

Figure 11:
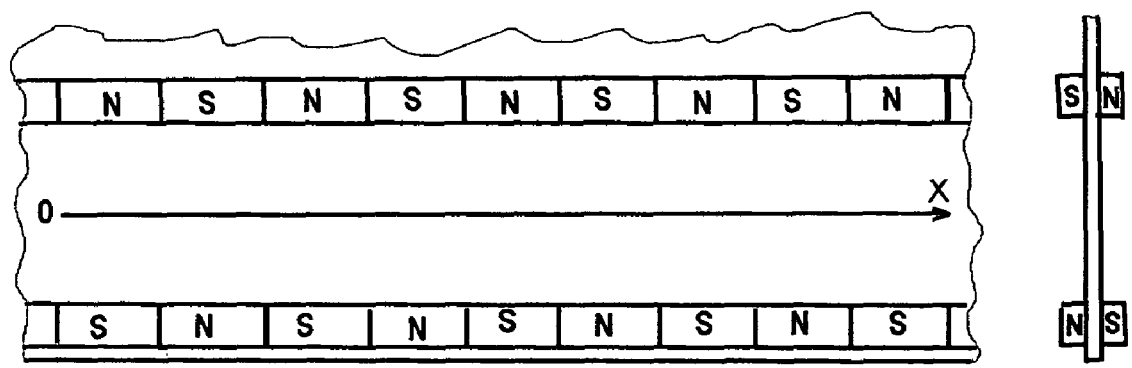

FIG. 12 illustrates cross-sectional view of the modified MDLSS unit. The unit consists of two components: mobile and immobile. The mobile component is a part of the levitator. FIG. 11 shows top- and side-view of moving levitator steel strip with two rows of permanent magnets situated at ifs both sides. The mobile part contains four long permanent magnets of rectangular cross-section assembled in a quadrupole with the help of a steel insert. The immobile component is a part of the stator. It consists of two laminated steel cores of C-shaped cross-sections extended along the entire guideway. They are located mirror-symmetrically and rigidly affixed to each other (by non-magnetic constrain) and to the guideway. Each core has a long back and two thickened tips. A constant air gap is maintained between the left and right-hand core tips. The quadrupole is inserted into this air gap and can move freely in all directions in there.

Magnetic fluxes in the unit (FIG. 12) penetrating into core tips produce forces attracting the quadrupole to the cores.

A specific force acting on a unitary surface of unsaturated steel (core tip) is oriented perpendicularly to the surface and proportional to the square of magnetic flux density. Proceeding from this basis, it will be proven that:
  a. a quadrupole located symmetrically between the core tips is in equilibrium;
  b. a lateral shift of the quadrupole from symmetrical position produces destabilizing force $F_d$ tending to increase the shift and to attract the quadrupole to the nearest core tips;
  c. a vertical shift of the quadrupole produces stabilizing force $F_s$ tending to decrease the shift and to bring the quadrupole back to equilibrium. The mode of the unit action at the vertical shift is similar to a bow. Tubes of magnetic flux closed through air are resilient. They are permanently coupled with their source—permanent magnets—and attracted by the tips of the steel cores. If the quadrupole shifts up or down, the flux tubes bend and stretch, thus creating the stabilizing force opposing the shift, which grows proportionally to the shift increase.

Hence the peculiarity of the unit is that quadrupole shifts produce not only a destabilizing force but also a stabilizing force.

Forces Acting on MDLSS Levitator

As it was said above any shift of the magnet assembly (levitator) with respect to the stator results in stabilizing and destabilizing forces appearing. The condition of stability (6) of the MDLSS system has been found analytically. When this condition is fulfilled, potential energy of the system has a strict local minimum, the resulting force is stabilizing and the system is stable. It has been proven that:
  a) in order to satisfy the condition of stability it is necessary to ensure a certain level of saturation in the steel cores;
  b) during magnets motion the level of saturation can be achieved with the help of aluminum screens covering the core backs and suppressing leakage fluxes from their lateral surfaces.

It has been also proven that the MDLSS system reacts to any shift and/or turn of the vehicle by producing internal magnetic forces and/or torques which return the vehicle to its trajectory.

The conclusion has been done that it is possible to build an engineering system ensuring a stable flight of the magnet assembly (levitator) along the extended steel cores (stator) by exploiting rigid constraints between magnetized bodies and dependence of their permeability on field intensity.

Now we consider a magnetic device "unit" comprising two immobile steel laminated cores having unlimited length and C-shaped cross-section, and four rectangular permanent magnets from No. 1 to No. 4 (with dimensions $2h \times W \times l_M$) assembled into a quadrupole by unsaturated steel insert. The cores consist of thin backs (with thickness $t_s$) and thickened core tips. The distance between the cores equals $2W + t_w + 2g$, where $t_w$ is thickness of the steel insert, g indicates the air gaps between the magnet poles and the ends of the core tips.

Similar to the scheme of FIG. 8 the quadrupole magnets and cores in the unit form a closed magnetic circuit containing: four permanent magnets with each magneto-motive force $mmf = e = \mu_0 W \cdot J$ (where the magnetizing vector J indicates coercive force $H_c$) and four internal reluctances $r_{in}$, four air gaps of total length 4g with magnetic reluctances $r_{gR}$ and $r_{gL}$ at the right and left sides respectively, two C-shaped steel cores with magnetic reluctances $r_{fR}$ and $r_{fL}$ at the right and left sides respectively (when the core backs are saturated).

The unsaturated steel insert with its magnetic reluctance equaled to zero separates the right-hand and left-hand loops of the magnetic circuit. This allows to determinate magnetic fluxes $\Psi_{wR}$ and $\Psi_{wL}$, following the Ohm's law.

It has been proved in [1] that $$F_d = F_y = C_d [\Psi_{WR} - \Psi_{WL}] \tag{8}$$

and $$F_S = -F_z = C_{SR}[\Psi_{WR}^b - \Psi_{WR}^t] + C_{SL}[\Psi_{WL}^b - \Psi_{WL}^t] \tag{9}$$

where $C_d$, $C_{SR}$ and $C_{SL}$ are constants, the letters "b" and "t", in subscripts identify the bottom and top halves of the core tip surface respectively, and the letters "R" and "L" in subscripts mean right and left core tips respectively.

A method to reduce the destabilizing force $F_d$ by saturating steel cores has been shown in [3] and [4] along with presenting an algorithm and deriving formulae for calculation of forces in MDLSS and for vehicle vibrations.

Leakage Fluxes and their Suppression

When the core backs in the unit get saturated, their magnetic reluctances $r_f(B_f)$ increase, and so does the tangential component of magnetic field intensity $H_t$ on the lateral surfaces of the core backs. In this case, leakage fluxes grows as well, causing reduction of core backs magnetic flux density $B_f$ that, in turn, leads to that saturation falls.

Now we will show that it is possible to suppress the leakage fluxes and to maintain a required level of saturation ($B_f$) over the whole core back length $l_s$ (FIGS. 12 and 13) by covering the core backs by aluminum screens and at the same time making magnetic fluxes in the cores to alternate periodically. In order to achieve this we split each levitator magnet into v equal parts and change polarity of all the even parts (turning them by angle 180°) that is shown in FIG. 11. When such levitator moves with speed $V_v$ magnetic flux alternates with frequency $f=V_v/\lambda$, where $\lambda=2L_l/v$ is the length of magnetic field traveling wave, $L_l$ is the length of the levitator, $V_v$ is vehicular speed.

To make the analysis more comprehensible let us simplify the magnetic unit design. Cross-sections of such units are shown in FIGS. 12 and 13. The unit is assembled from the parts of simple configuration. The lateral part of the unit containing a core back is presented as three-layer medium symmetrical with respect to the core back (parallel to Axis 0Z) in FIGS. 14 and 15

Figure 10:
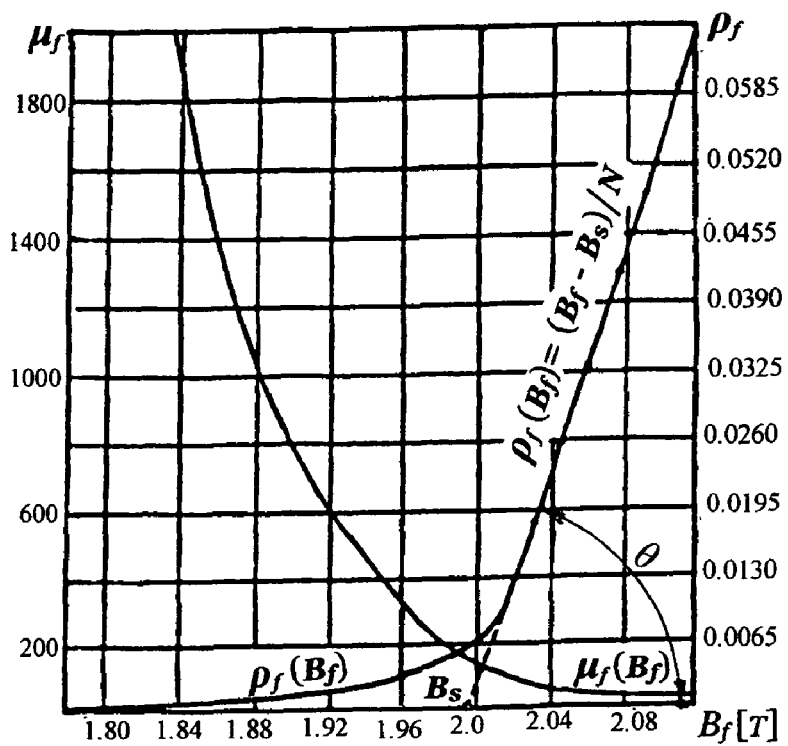

The levitator's magnets of alternating polarity (FIG. 12), flying over the stator's core tips at small distance g, magnetize the core backs. The cores are recommended to be made of thin laminated steel M5 of thickness 0.3 mm. Eddy-currents induced in such cores are negligibly small, and therefore magnetization happens practically instantaneously over the entire back length $l_s$ producing there magnetic wave traveling along the guideway (Axis OX) with velocity $V_v$, coinciding with the vehicle speed. Both sides of each core back are covered by aluminum screens (FIGS. 12 and 13) of specific conductivity $\sigma_a=3.7\cdot10^7[1/(Ohm\cdot m)]$. It is necessary that the core back has such a thickness to ensure magnetic flux density $B\geqq2.05$ T distributed over the entire length that corresponds to $\mu_f\leqq40\mu_0$ (FIG. 10). In this case dropping magnetic reluctance $r_g$ of the air gap g will be substantially compensated by growing magnetic reluctance $r_f$ of the saturated core back. Its working magnetic flux $\Psi_W$ is produced by two rows of identical rare-earth magnets of rectangular shape of alternating polarity are rigidly affixed to the wider side of a steel insert. The narrow side of the insert is rigidly affixed to the bottom of the vehicle (or to its external wall) as shown in FIG. 1. Each group of four magnets form a quadrupole (FIG. 12). Each pair of magnets affixed to the same side of the insert produces its own part of the working magnetic flux $\Delta\Psi_W$ closed through a separate loop including: the laminated steel core (made of thin sheets of electrical steel M-5), two air gaps g (between the magnet poles and core tips), and the insert body (FIGS. 5 and 6).

Figure 14:
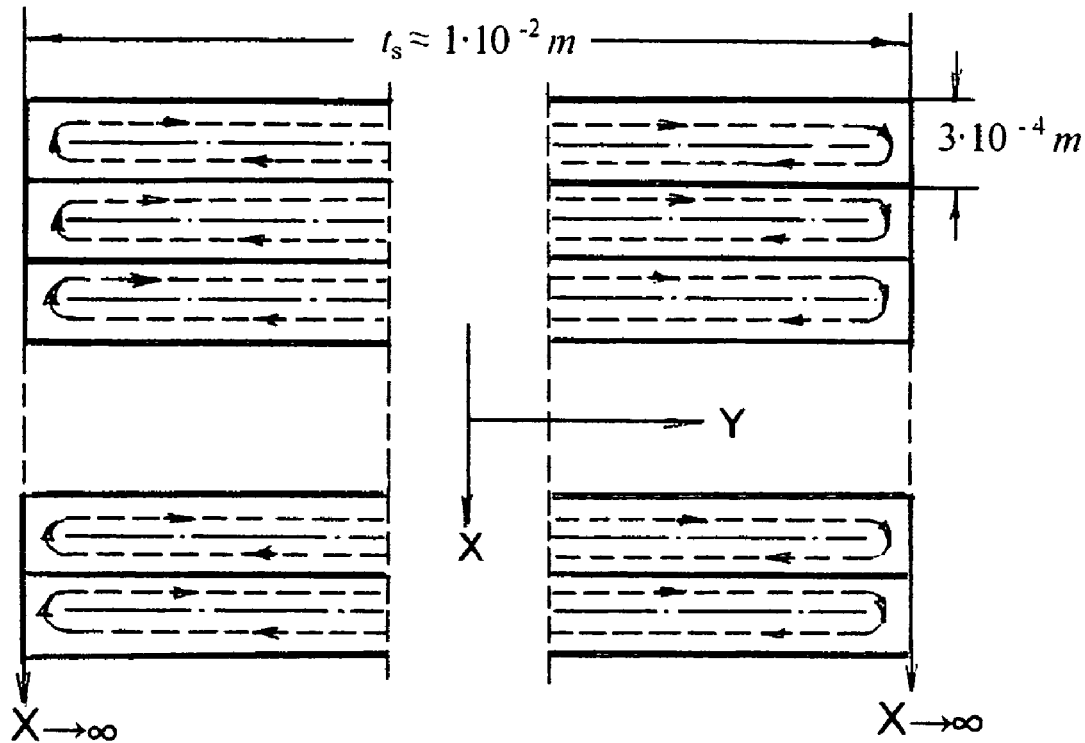

Since all the steel sheets of the laminated core are electrically isolated from each other the alternative flux in each sheet induces its own eddy current contour $\Delta i$ (FIG. 14). Eddy currents flow in the cross section of the sheet: on the right and left its side in opposite direction (+y and −y) closing on the ends adjacent to aluminum screens as shown in FIGS. 12 and 13. Since the width $t_s$ of the sheet is much bigger than its thickness $h_l(t_s>30h_l)$ and the directions of the current in both sides of the sheet are opposite to each other, the electrical resistance of the contour is big, and the current is very small in value. In addition electrical fields of contrary currents in the sheet compensate each other and therefore the resulting electrical field outside of the sheet is negligibly small. As a result only magnetic wave travels in the core along axis OX with velocity $V_v$ equaled to the speed of the moving vehicle. In this case magnetic leakage fluxes $\Delta\Psi_l$ with their density $B_n=B/\mu_f=2.05/40=0.05125$ T will penetrate into the screen from the saturated core. The lines of forces of the leakage fluxes induce contours of eddy-currents on the screen surface. According to Lentz's Electromagnetic Inertia principle magnetic field produced by the eddy currents in the screen is almost equaled and directed contrarily to the leakage fluxes thus suppressing them. Approximate estimations have shown that thickness of aluminum screen $t_{scrs}>1$ cm is quite sufficient for suppressing leakage fluxes. In addition it insures durability of unit assembly. Consequently a metallic screen of high conductivity performs a function of an insulator of alternative magnetic flux. Hence the level of saturation of steel core may be maintained on required level that insures a necessary value of the stabilizing force $F_s$ at a vehicle shift (in range ±g/2) and its stable flight.

We assume that magnetic flux density there is $B\approx2.05$ T (at $\mu_f\leqq40$). Then the amplitude of magnetic field intensity $H_{f0}$ in the core back is $$H_{f0} \geq \frac{B}{\mu_0 \cdot \mu_f} = \frac{2.05}{4\pi \cdot 10^{-7} \cdot 40} \approx 40800 A/m = K_0 \tag{10}$$

where $K_0$ is the amplitude of magnetic field intensity in the core back.

Alternating magnetic fluxes $\Delta\Psi_l$ penetrating into aluminum screens induce eddy-currents which in turn produce a counter magnetic field suppressing amplitude of leakage flux $\Delta\Psi_l$ oscillations and, thus maintaining saturation in the core backs along the whole lengths.

Figure 15:
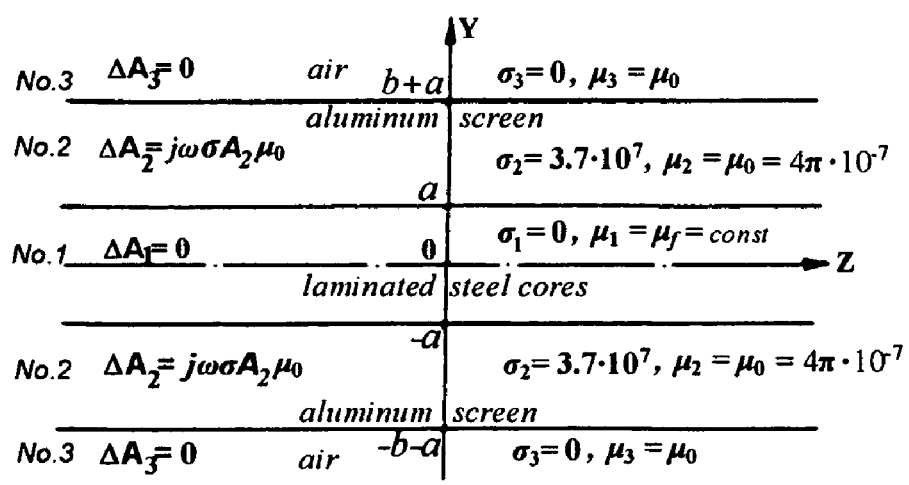

Plane magnetic wave traveling in the laminated core back along Axis 0X crosses the planes of its steel sheets (FIG. 14) in three-layer medium (FIG. 15) containing two flat aluminum screens. The lateral surface of the core back of FIG. 15 is the upper boundary (plane y=a) of the layer No. 1. The plane y=−a is the bottom boundary of the first layer of the laminated steel core back.

The layers No. 2 (from the top and bottom of the core back) are aluminum screens of thickness b, conductivity $\sigma_2=3.7\cdot10^7$ [1/(ohm·m)], and permeability $\mu_2=\mu_0$. At the very top and bottom of the medium is the air (y>b, y≦b) with conductivity $\sigma_3=0$, and permeability $\mu_3=\mu_0$ (layers No. 3).

The main part of the wave in the layer No. 1 travels along Axis 0X with constant speed $V_v$ of the vehicle not spending much energy. However its lateral parts, touching aluminum screen, interact with free (mobile) electrons and produce eddy-currents. Energy of these parts of the wave is spent for heating screens. Their velocities $V_{em}$ drop abruptly and direction of their movement becomes almost perpendicular to the screen surface.

MDLSS is an example of a conservative system comprising permanent magnets and steel cores covered by aluminum screens. Its potential energy has a local extreme. However when the MDLSS levitator is still, its equilibrium is unstable because in this case the extreme appears to be maximum. As levitator speed increases, leakage flux decreases, energy maximum is suppressed and then, at the speed of V>15 m/s, will turn into minimum. When the levitator speed exceeds 100 m/s the stiffness of its stabilizing force per 1 m of the levitator length reaches $2.0\cdot10^6$ N/m². Such stiffness ensures stable flight of the vehicle along the core tips without touching and friction at the shifts from Axis OX less than 3 mm. It means that it is possible to make an air gap between a magnet and core tips less than 1 cm. We can make the conclusion from the said above that it is possible in principle to build stable MDLSS based on rare-earth permanent magnets and steel laminated cores employing electromagnetic barrier.

Near stop stations and also at the guideway curvature of small radius where the vehicular speed is small (less than 15 m/s) the leakage fluxes can not be reduced and the stabilizing force decreases. Therefore the additional means for stabilization of the vehicle is required.

For this aim the both ends of each stop-station at the places where a vehicle starts or finishes its movement and also at said curvatures two narrow non-elastic rubber bands are inserted on both concrete guideway walls (extension of each band is approximately by 1.5-2 km). Two or three pairs of horizontal duralumin wheels are supposed to roll along the bands. The wheels are set down on rolling bearings and affixed to the front and rear parts the metallic vehicle floor and designated to compensate the destabilizing forces $F_d$ in the MDLSS units at the small vehicular speed.

At the turning fragment of the trajectory with big curvature radiuses on the guideway trajectory turnings and also increase of stator winding turn length where the curvature is straightening (that is equivalent to increasing vehicle speed) ensure conditions when the value of centrifugal force does not exceed the half of the vehicle weight. At these segment of guideway dimensions of the parts of the guiding (horizontal) MDLSS units: thicknesses of permanent magnets and laminated steel cores can be reduced compared to the supporting units. As was said above, the profile of core tip surfaces of the guiding units should be hyperbolic (FIG. 12).

Phenomenon of MDLSS Self-Regulation

Figure 9:
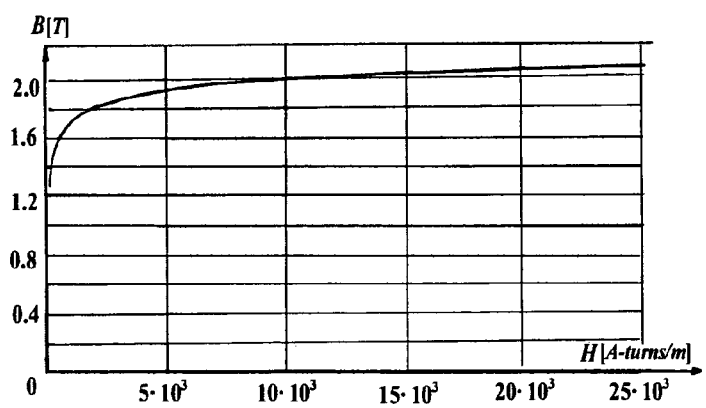

For better understanding of all the processes developing in the MDLSS it is worthwhile to repeat here the essential points of MDLSS self-regulation:

1. According to Lagrange-Dirichlet theorem (L-D) position of Amlev car (and MDLSS levitator) on its track will be stable if potential energy E, of magnetic field generated by permanent magnets of the levitator would have a local minimum in the points of equilibrium of magnetic forces, that move along the path. Consequently, a requirement for safe flight of the car would be such design of both stator and levitator that would ensure minimum E~ of potential energy of the field of levitator magnets and stator cores along the entire length of the car track for any acceptable speed ($V_v$>15 m/s).
2. Levitator is firmly connected to the car and the stator—to the ground, so Amlev system can be regarded to as motion of one solid body along the other, immobile and of unlimited length. The minimum $E_{pm}$ would mean that every force within car vicinity along the entire track is a stabilizing force, $F_s$, that is returning the car to its track at any shift $\delta$ from it due to external forces. $F_s$ has to be greater then these external forces.
3. A magnet of rectangular shape located in a gap between the tips of steel cores can generate one stabilizing force $F_s$ only when the tips are ideally symmetrical in regard to magnet poles (FIGS. 5 and 6). In this case, destabilizing forces $F_d$, which pull the magnet to the tips, are equal and compensate each other.
4. Two similar devices (FIG. 5) arranged in perpendicular planes and attached to each other by stiff non-magnetic connectors (both between magnets and between cores) create a system where any shift of a magnet at any angle $\alpha$ (in the plane YOZ) generates stabilizing force $F_s(\alpha)=F_s$ (FIG. 7), as forces are added geometrically and $\sin^2 \alpha + \cos^2 \alpha = 1$ for any shift $\delta_\alpha$ of the magnets.
5. Experiments and calculations show that in the system with immobile magnets, $F_d$ is always greater then $F_s$, in other words it is impossible to ensure a minimum of potential energy. This led to an erroneous conclusion that creating a Maglev system on permanent magnets and steel cores is impossible.
6. Design in FIG. 7 is different from FIG. 5, because it has four C-shaped steel cores and four magnets on each side of a steel plate bent at 90 degrees. Magnets are distributed symmetrically between core tips and each four compose a quadruple. Cores are connected by stiff links. FIG. 7 shows arrangement of magnets and cores in MDLSS.
7. It is known that magnetic permeability of steel $\mu_f$ declines rapidly when the density of magnetic flux in it (magnetic induction) increases (FIGS. 9 and 10). At the same time magnetic reluctance of the steel core increases rapidly. FIG. 10 shows that with B≧2.02 T specific magnetic reluctance $$\rho = \frac{1}{\mu_f}$$

grows almost along straight line.
8. Formula (2-8) shows that destabilizing force $F_y=F_d$ is proportional to the difference ($\Psi_{wR}-\Psi_{wL}$) of magnetic fluxes in the right and left tips. Hence in order to reduce $F_d$ the value of this difference during horizontal shifts has to be reduced in such a way that in the MDLSS system inequality $F_s>F_d$ (optimum at $F_d=0$) would always be true. Non-linearity of magnetic permeability of steel is used to attain this.
9. If the quadruple is placed symmetrically between core tips we have to calculate the flux from the magnet penetrating one tip. Because the air gap is small (g<0.01 m) and the length of each magnet $I_m=0.1$ m≧10 g, the field in the gap can be assumed to be flat-parallel. Assuming the core shape is that of a branch of hyperbola (FIG. 12) magnetic flux can be calculated with enough precision using the method of conformal transformation of the gap onto poles [8] next we have to select the size of the core back (its length $l_s$ (FIG. 12) and thickness $t_s$) that would ensure induction in it be equal to 2.05-2.06 T (assuming there's no leakage flux from the core back) and its magnetic reluctance (with the back width equal to magnet length) would be equal to reluctance of the air gap between the magnet pole and core tip.
10. If quadrupole is in equilibrium and the unit core backs are saturated, then a small shift $\Delta y<g$ increases the flux $\Psi_{wR}$ (caused by the reduction of reluctance $r_{gR}$) and at the same time increases magnetic reluctance $r_{fR}$ of the core by value $\Delta r_{fR}$. Vice versa, a decrease in the flux $\Psi_{wL}$ (caused by the growth of the reluctance $r_{gL}$) will lessen the reluctance $r_{fL}$ by value $\Delta r_{fL}$. Thus, in a unit with saturated cores the horizontal shift of the magnets $\Delta y$ changes the full reluctances $r_m=r+r_f$ of the magnetic circuit loops: in the right side loop $r_{mR}=(r\times\Delta r_g)+(r_f+\Delta r_f)$, and in the left-side loop $r_{mL}=(r+\Delta r_g)+(r_f-\Delta r_f)$, by value $r_{ml}-r_{mR}=2(\Delta r_g-\Delta r_f)$. In these expressions $r=r_{in}+r_g$ is a linear part of the loop reluctances (spaces between the steel insert and the tips in FIG. 12) which is less than in case of unsaturated cores, i.e., $r_{gL}-r_{gR}=2\Delta r_g>2(\Delta r_g-\Delta r_f)$. It follows that the difference between the working fluxes and therefore the destabilizing force $F_d=C_d(\Psi_{wR}-\Psi_{wL})$ produced by this difference in the unit can be reduced by employing core steel saturation.

11. Dimensions of rectangular magnets in quadrupoles have to be as follows: 2h=0.04 m, W=(0.025–0.027)m, $l_M$=0.1 m. Poles of the magnets must alternate (N, S, N, S . . . ) along the steel strip insert on its both sides. Then car movement will create alternating magnetic flux in the backs of steel cores, that changes with the frequency f proportional to the car speed V. An electromagnetic wave running with the speed of the car is produced.

12. Cores have to be made of electrical steel sheet M5 with the thickness of 0.3 mm (FIG. 15). Then eddy currents induced in the sheets will be mutually compensated and electric part of the wave will practically disappear leaving only the running magnetic wave with the magnetic field intensity $H_f \approx 41 \cdot 10^3$ a/m.

13. As a result of saturation of steel cores, alternating magnetic leakage fluxes—$\Psi_{lk}$ will flow from vertical side surfaces of the sheets, covered with aluminum screens (FIGS. 12. and 13). When penetrating aluminum screens (with high electric conductivity, $$\sigma = 3.7 \cdot 10^7 \frac{1}{om \cdot m}$$

leakage fluxes will induce in them eddy currents of such magnitude and direction that will allow them, according to the Lenz's principle of electromagnetic inertia, create magnetic fluxes almost equal and directed oppositely to leakage fluxes and compensate them. Hence aluminum screens will perform as insulators for magnetic leakage fluxes from the cores, ensuring saturation and high magnetic reluctance of the core backs and $F_s > F_d$, as well as the minimum of potential magnetic energy along the entire track of the car moving with the speed $V_v > 15$ m/s.

Permanent Magnet Linear Synchronous Motor (PMLSM), General Information

Here we present Permanent Magnet Linear Synchronous Motor providing maximum speed of the vehicle –150 m/s (540 km/h) with its power been compared to PMLSM presented in [2] and [5]. Next we will give detailed description of its propulsion force nature, its remodeled design and conditions of its launching and operation.

Figure 16:
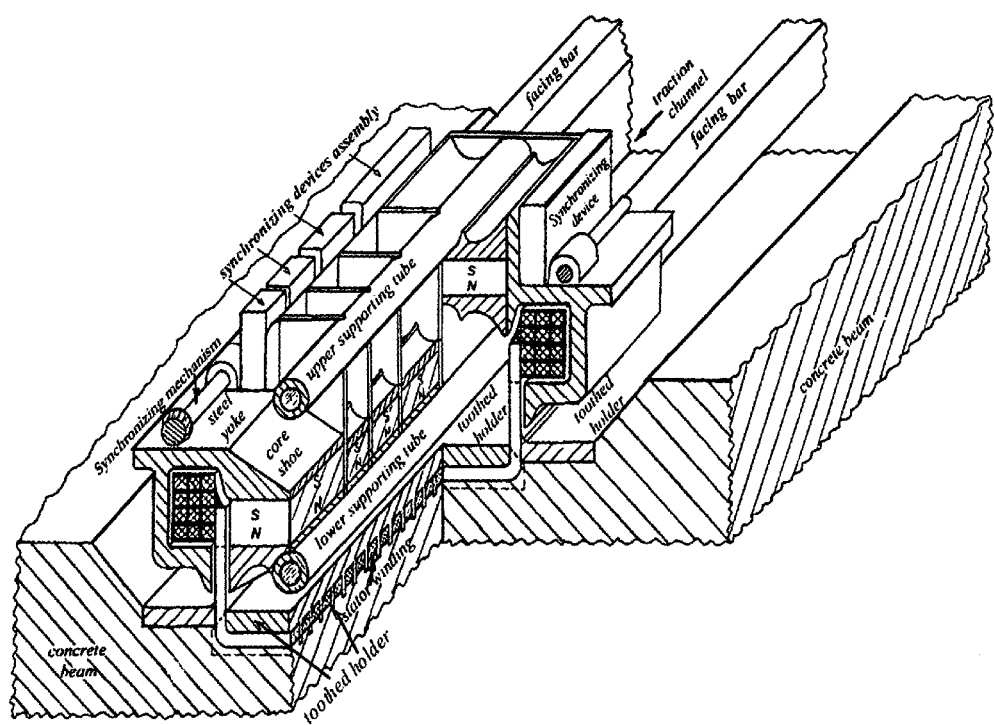
Figure 17:
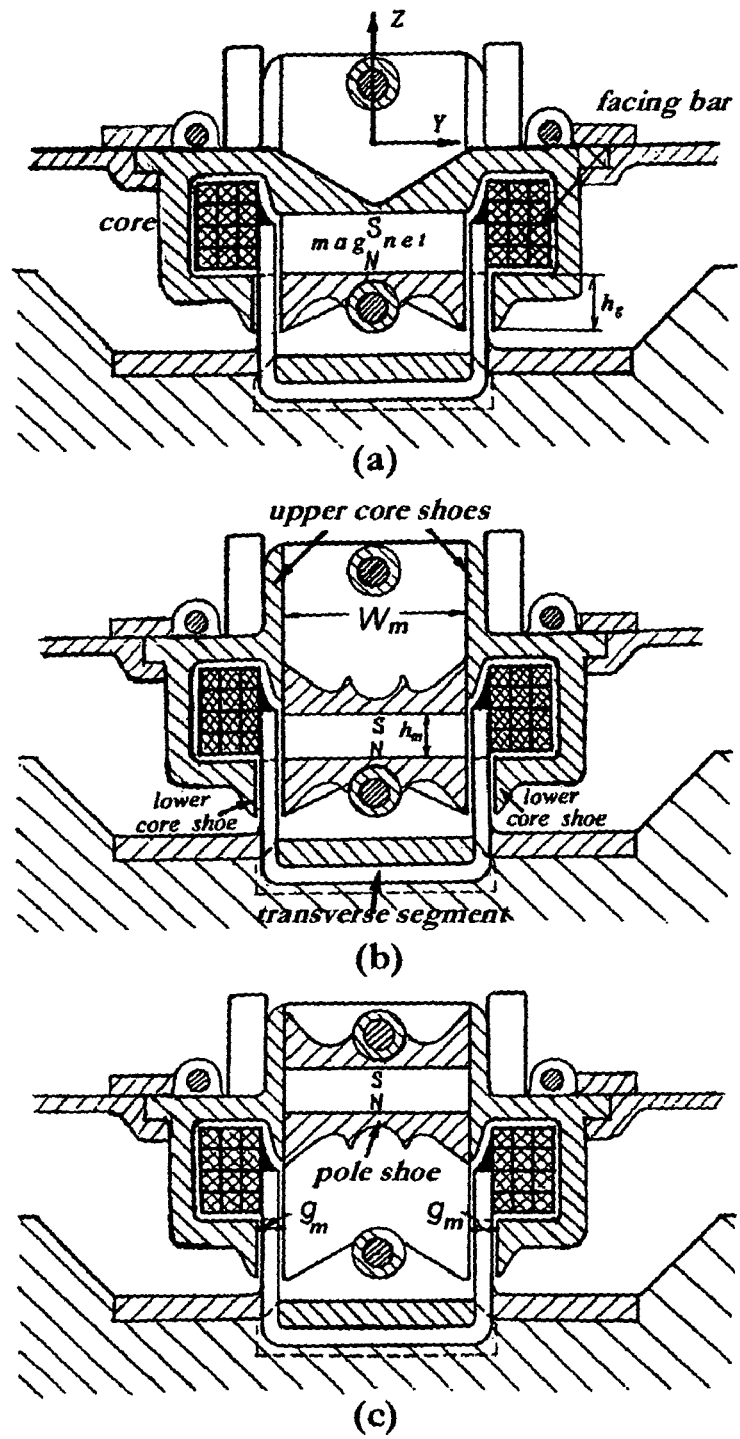
Figure 18:
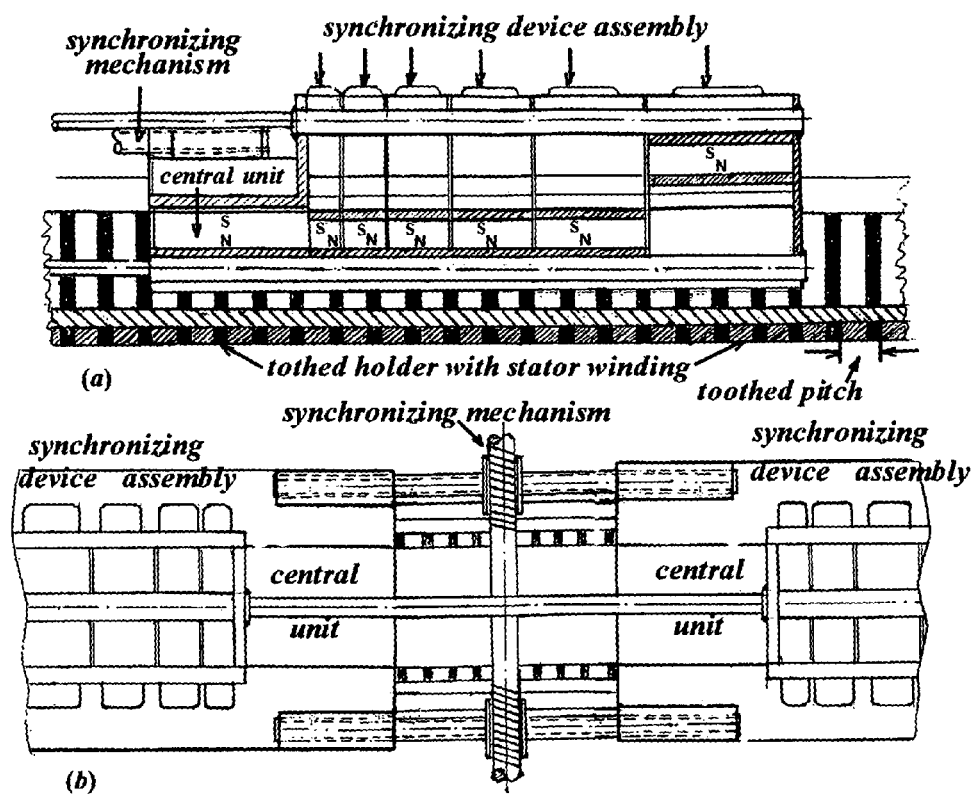
Figure 19:
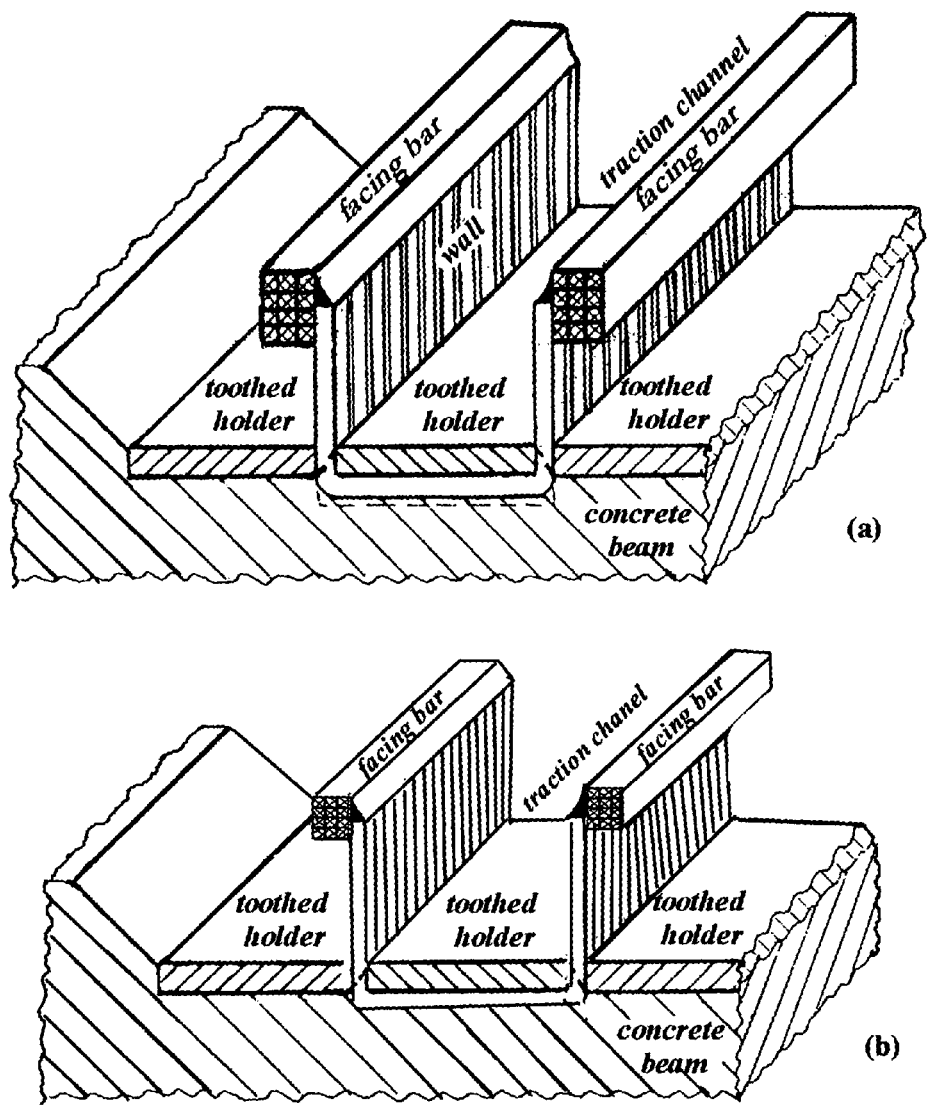
Figure 20:
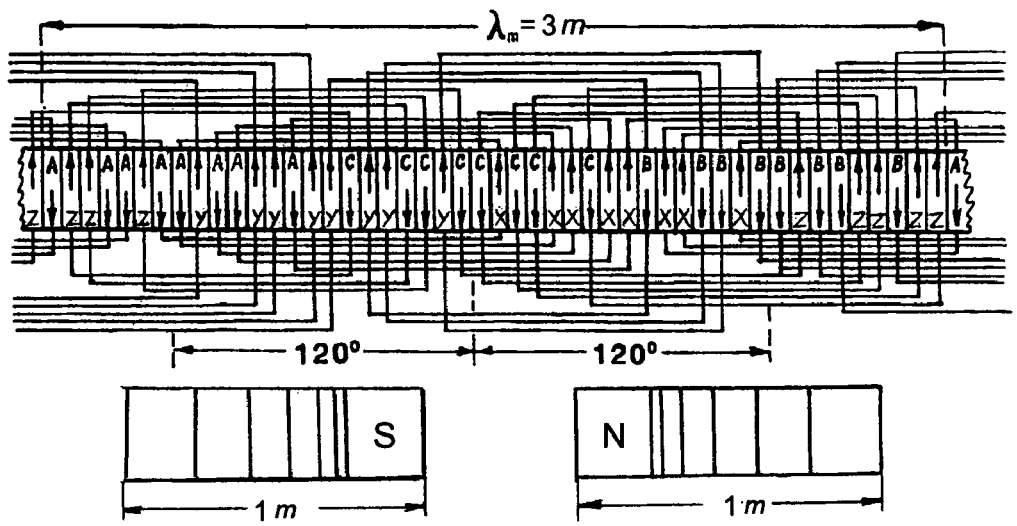

The general view of PMLSM is shown in FIG. 16. The PLMSM comprises two functionally connected and interacting with each other parts:
(a) immobile part—stator winding of variable turn length distributed along the guideway (FIGS. 18, 19 and 20);
(b) mobile part—permanent magnet rotor installed on a vehicle (FIGS. 17 and 18).

In addition it has:
(c) an assembly of synchronizing devices designated for stepped changing the rotor pole length during vehicle motion (FIG. 18-a);
(d) synchronizing mechanism designated for smooth changing rotor pole pitch during vehicle motion (FIG. 18-b).

It is worthwhile to outline here peculiarity of PMLSM.

The ability for self-regulation and high stiffness of stabilizing forces in magneto-dynamic suspension (MDLSS) system ensures safe vehicular flight within small gaps. This makes it possible to work out a new design for self-regulating permanent magnet linear synchronous motor. The PMLSM is designated for vehicle propulsion in high speed ground transportation systems.

As opposed to an ordinary linear synchronous motor, the PM has the following peculiarities:
1) System of powering of PMLSM is conventional, its stator three-phase winding is powered by AC current of constant frequency 50 Hz;
2) the turn lengths of the winding and the cross-section of its bus-bars vary along the path, adjusting velocity of the traveling wave, rotor speed and its propulsion force as appropriate at different segments of the path;
3) during vehicle motion the length of the rotor pole pitches automatically change in accordance with changes in the stator winding turn length increasing magnetic flux and propulsion force;
4) the PMLSM is self-regulating.

All above peculiarities are very important because they make it possible to ensure stable operation of the PMLSM.

Nature of Propulsion Force in PMLSM

It is known that a rotation synchronous motor is self-regulating: increasing loads on its shaft leads to increasing the shift of its magnet poles in the direction of their lagging from current half-wave in the stator winding while reducing the loads leads to reducing the shift. As a result rotation velocity does not change. The mode of PMLSM operation is the same. Resilience of flux pipes (lines of force) lays in the ground of self-regulation of both types of motors. It is limited by value of the loads expressed by formula $F_p = B_y \cdot 2h_g \cdot I$, where $h_g$ is height of a lower yoke shoe equaled to a magnet shoe, $$I = \sum_1^n I_i$$

that equals the sum of currents in the rotor air gap (FIG. 17-a). A linear synchronous motor has the same kind of limited self-regulation as a rotating one. However the range of self-regulation in PMLSM can be expanded in such manner to involve the whole possible diapasons of loads and speeds without falling out of synchronism.

Let us consider the nature of propulsion force $F_p$. It is known that the Lorentz force $F_{Lor}$, produced by both electrical E and magnetic H fields, acting on electrical charge e that moves with velocity V, is expressed by formula:

$$F_{Lor} = e(E + \mu_0[V \cdot H])$$

However we take interest just in a part of Lorentz force that is its component $F_{xlor}$ equaled to propulsion force $F_p = F_{xlor}$ produced by magnetic field $\mu_0 H_y = B_y$, acting at charge $$Q = \sum_1^n I \cdot t,$$

flowing with speed $$V_z = \frac{2h_g}{t}$$

in the vertical fragments of bus bar (of length $h_g$) of PMLSM stator winding. Electrical field E just pushes the charges along the bus bars and does not contribute in producing propulsion force.

When $\mu_0 H = B$, and vectors $V = V_z$ and $B = B_y$ are reciprocally perpendicular, Lorentz formula looks like $$F_{Lor} = e \cdot [V \cdot B] = e \cdot V_z \cdot B_y$$

In our case electrical current flows in vertical sections of the stator bus-bars situated in air gap $g_m$ (between lower yoke shoes and rotor magnet shoes moving with speed $V_z$) where magnetic field $B_y$ is homogeneous (FIGS. 16 and 17).
The current can be found by the following formula:

$$\sum_{i=1}^{n} I_{zi} = \frac{\sum_{1}^{n} e}{t} = \frac{Q}{t}, \text{ where}$$

$n \geq 2/3 \cdot 48 = 32$ is the number of bus bars situated under magnet poles, Q is summarized charge flowing in n bus bars. Then the formula for component of $F_{Lor}$ (i.e., propulsion force $F_p$) is as follows:

$$F_{xLor} = Q \cdot V_z \cdot B_y = \sum I_z \cdot t \cdot \frac{2h_g}{t} \cdot B_y = B_y \cdot 2h_g \cdot \sum_{1}^{n} I_z = F_{xp}$$

All the bus bars of the stator winding are fixed and are immobile. Magnetic field $B_y$ in the PMLSM rotor displaces currents in the bus bars towards its back wall thus making pressure on them. According to the First Newton's Law the same pressure acts on the PMLSM magnets thus producing propulsion force $F_p$.

When speed $V_x$ of the rotor (affixed to the vehicle) is growing the length $\lambda$ of the current wave, and also bus-bar width and rotor magnet poles length are growing too in proportion with the speed. Meanwhile voltage and thickness of isolation between adjacent bus-bars of the stator winding as well as current density j in the bus-bars remain constant. Therefore the sum current in the gap under magnet poles grows faster than vehicular speed. (The growth of the sum current similar to the growth of air resistance to flying vehicle is proportional to $V_x^2$)

Both PMLSM parts—stator winding and permanent magnet rotor—interact with each other. The design of each separate part serves common purpose: to ensure the PMLSM stable work (without falling out of synchronism) and its self-regulation (continuous adjustment of propulsion force to its speed).

Design of PMLSM Stator Winding Assembly
FIG. 19 shows the stator winding assembly.

It is critical to remind here its the most essential features. The linear stator/guideway comprises stator/guideway assembly including a stator winding with a plurality of mirror-symmetrical turns having different length along the winding. As stated above, the winding is powered by three-phase alternating sinusoidal current of constant frequency 50 Hz. Each of the turns of the stator winding includes four vertical working segments, two horizontal and two longitudinal segments. The vertical and horizontal segments form layers of conductors. The longitudinal segments of all the winding turns form two symmetrical facing bars as a monolithic multilayer of conductors agglutinated to one another by electrical insulation. The facing bars are freely inserted in two symmetrical hollows of the rotor.

The original design of PMLSM stator winding was presented in [2]. Now it is essentially improved. The stator has only one-fold winding as opposed to two-fold winding presented in [2]. This allows to simplify considerably technology of its manufacturing.

In the presented design we employ one-fold winding non-uniformly distributed along the guideway. The stator winding is powered by three-phased sinusoidal current of constant frequency 50 Hz (versus 25 Hz in the previous versions). Applying this frequency allowed:
(a) to utilize conventional power system, i.e. considerably simplify power system;
(b) to shorten the length of each stator winding turn (its longitudinal segment) twice;
(c) to reduce the number of winding turns getting through both symmetrical hollows of the permanent magnet rotor (FIGS. 18 and 19), number of the longitudinal segments of each facing bar varies from 8 to 11 (versus 20 in [2])

All stated above made it possible to reduce significantly the weight of the stator winding assembly (up to 2.5 times).

Design of winding turns fitting in the length of traveling wave $\lambda(V)$ with modified rotor pole-pitches is shown in FIG. 20. Dimensions in [m] correspond to maximal velocity of the traveling wave $V_m = 150$ m/s Design of PMLSM Rotor One can get the detailed visualization of the permanent magnet rotor assembly together with its synchronizing mechanism and synchronizing devices from FIGS. 16, 17 and 18.

Though the design of PMLSM rotor was described in [2] and [5] we revisit here the fundamental theses related to present design.

The permanent magnet rotor comprises two symmetrical pole-pitches and involves plurality of magnetic units positioned in a row along the vehicle (FIG. 17). The first unit of each pole-pitch is called "central unit". All the magnetic units are situated symmetrically with regard to central units and affixed on extensible halves of the rotor. Each magnetic unit has the same length but opposite polarity in regards to its symmetrical unit on the opposite part of the rotor and includes two steel cores and a permanent magnet magnetized vertically and can move between downward and upward positions with respect to steel cores except the central unit that is immobile, two air gaps being formed between. The permanent magnet, being in the downward (working) position, creates permanent magnetic field in the air gaps. The above mentioned layers of conductors of working stator winding segments powered with three-phase alternating sinusoidal current of constant frequency 50 Hz, are extended within the air gaps so that the traveling electrical current wave interacts with permanent magnetic field in the air gaps, creating a propulsion force propelling the vehicle along its trajectory. Pole-pitch of the permanent rotor increases up to its maximum when all the permanent magnets move downwards from the upward position.

The propulsion force can be regulated by two different manners. The first is increasing or decreasing the traveling wave current and the traveling wave length predetermined by the design of stator winding. The second is increasing or decreasing the pole pitch length. The most effective way is to apply both simultaneously.

An assembly of synchronizing devices is designated for stepped alteration of the rotor pole length during vehicle motion by displacing down/up corresponding unit. A synchronizing mechanism designated for changing smooth alteration of the rotor pole pitch during the vehicle motion by drawing apart or together the rotor front and rear halves. Both synchronizing devices and synchronizing mechanism operatively associated with said rotor and performing coordination between the length of the stator winding turns and the length of the rotor pole-pitches in such a way to provide maximum said propulsion force.

In the presented design the rotor differs from previous versions as follows:

a) a magnet rotor pole-pitch comprises seven units of variable length (versus six units of constant length presented in [2]), its summarized length is 1 m (FIG. 20);
(b) the units are twice shortened in length: the central unit is 0.25 m, the new lengths of the rest magnetic units increase from 0.055 m to 0.25 m counting from the central units;
(c) the length of traveling wave is reduced in half;
(d) capacities of synchronizing device and synchronizing mechanism are reduced in a half.

All these modifications provide increased maximum propulsion force at minimum jolts of a vehicle.

Conditions of PMLSM Launching and Operation

Now let's consider how a vehicle would depart from a stop station and how it would be returned to a nearest stop station in case of emergency. When the vehicle reduces its speed at a stop station, it is suspended in the magnetic field of MDLSS supporting units. It is also stabilized by horizontal wheels. During departure these wheels will also support the vehicle on a straight segment.

Constant distance $W_c$ between concrete walls of the guideway and big curvature radius of vehicle's trajectory ($R_g > 1000$ m) ensure reliable lateral stabilization of the vehicle with the help of four horizontal wheels rolling freely in separate narrow guiding paths affixed to guideway walls. Wheel shafts are affixed rigidly to the vehicle metallic floor. Wheels are set on their shafts with the help of rolling bearings. Shaft centers of each pair must be on the same line, perpendicular to the vehicle track. Diameters of all wheels are: $d \approx 0.3 \div 0.4$ m. The wheels are located on the both sides in the front and back parts of the vehicle. Rims of the wheels come through four slots in vehicle walls close to the bottom and touch guiding paths. Such a design allows horizontal wheels to compensate lateral forces affecting the vehicle by reaction of guideway channel concrete walls at the vehicle speed $V_v < 15$ m/s. For this purpose wheel trenches in the walls will be paved with long strips of firm rubber. Horizontal wheels will touch rubber strips and spin, creating additional stabilizing force $F_s$ until vehicle reaches the speed at which saturation of laminated cores removes destabilizing force $F_d$ in supporting units.

At the starting segment of PMLSM winding the lengths of the winds and cross-sections of bus-bars are constant. The winding will be fed by alternating current through electronic power conversion equipment that converts power of constant voltage and frequency into that of variable voltage and frequency. Such power is applied to the windings. When current frequency in the starting windings will reach the value of $f \approx 50$ Hz it should not be changed anymore. By this time the car will approach the beginning of the main part of propulsion winding and be about 6 m away from it. This part of the winding is fed by the current of constant frequency $f \approx 50$ Hz. Before the strip of the rotor of the synchronous engine reaches propulsion winding, electronic synchronizer has to ensure that phase of the current of the starting winding coincides with phase of the current in propulsion winding, thus preventing linear motor fallout of synchronism.

Electronic equipment used here is of the same type that is used in Transrapid, but its power and consequently its cost is about 100 times less.

In case of interruption of power supply to propulsion winding, air resistance will slow down the vehicle until its complete smooth stop. A special bus with the distance between the wheels equal to the distance between the outer walls of the guideway concrete base, will hook-up the vehicle and pull it to the closest station.

At the acceleration section the winding turn length and its wire cross-section gradually increase, and so does velocity of the current traveling wave.

As was noted above, acceleration of the vehicle is achieved with the help of both the synchronizing device assembly and the synchronizing mechanism. The synchronizing mechanism is designed for smooth regulation of the rotor pole pitches by drawing apart or together the magnetic unit assembly pertaining to the rotor's front and rear halves. The synchronizing device assembly serves for step by step changing the length of the permanent magnet poles (simultaneously with changing the turn length of the stator winding during the vehicular motion) by engaging or disengaging a corresponding unit.

The synchronizing mechanism starts working just after the vehicle reaches an acceleration section. It reacts on increment of the winding turn length and changes the distances between both halves of the rotor's yoke, thus increasing propulsion force and the vehicle speed.

Let us consider how the synchronizing device assembly works when the vehicle moves at the acceleration section. Each pair of mirror-symmetrical devices is switched on by a signal of its own sensor and increases gradually the length of the permanent magnet poles in compliance with increasing traveling wave velocity. Then, the propulsion force grows and this helps the vehicle to overcome the growing air resistance and vehicle inertia.

The synchronizing device assembly engages and disengages the rotor magnet units in strict sequences. Each signal from the next sensor switchs on/off its drive gear. In its turn that moves downward/upward two magnets of opposite polarity (pertaining to the front and rear halves of the rotor yoke) starting from the closest to the rotor central fixed magnets. Either process: electric, hydraulic, or pneumatic may be utilized for designing a drive gear. FIG. 18 shows the synchronized device assembly with engaged units. The last unit is disengaged.

The total (summarized) current grows when approaching the middle of the half-wave. We know that the length $L_W$ of the winding turns in the rotor air gap grows when the vehicle moves on an acceleration section. Thus, we can come to the conclusion that moving apart the rotor halves, we will synchronously increase the total current in the gap and the propulsion force. For evaluation of this phenomenon we will employ an utilization factor $K_u$ for a rotor magnet. The utilization factor equals the ratio of value of the real current in the gap to its maximum value (i.e., the amplitude of the current $I_m$ in each bus multiplied by the number of the buses having entered into the gap at the moment).

Figure 21:
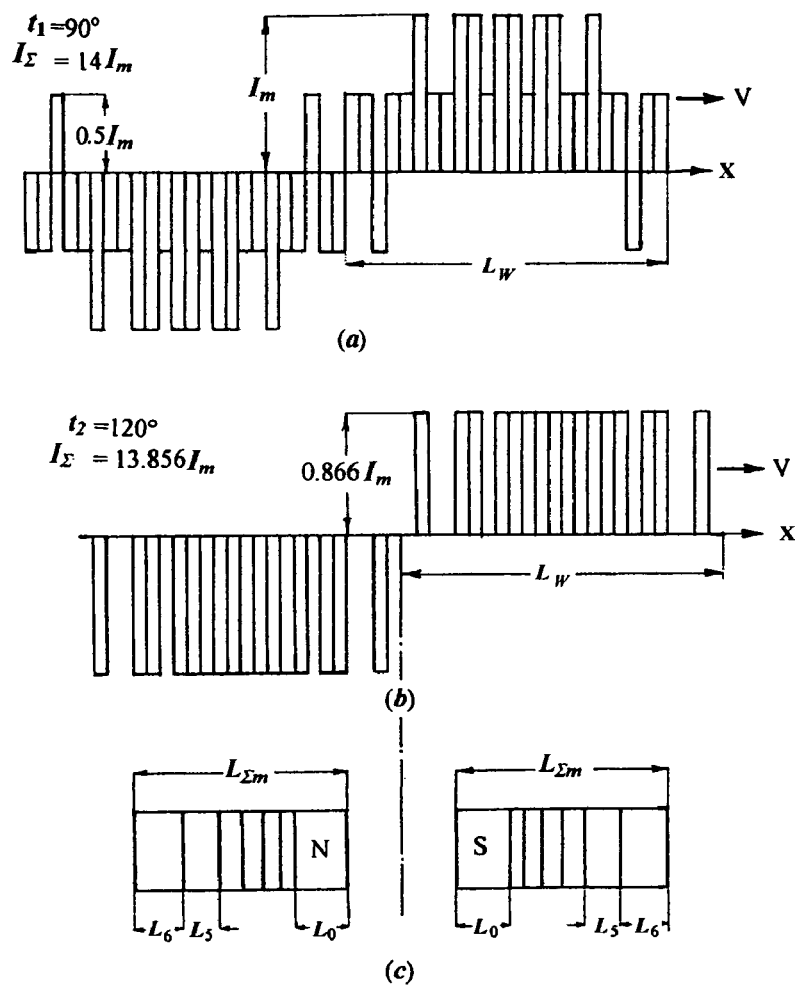

The length $L_0$ of the central magnets and length $L_W$ of the winding turns at the initial point of an acceleration section are equal to each other $L_W = L_0 = 0.25$ m. The rotor starts accelerating with propulsion force $F_p = B \, 2h_g I_\Sigma$ just after it gets synchronization with the traveling current wave. At the same time the length and cross-section of the stator winding starts growing. At the beginning of the acceleration section all twenty four buses with the total current $I_\Sigma = 14 I_m$ are situated in the air gap (FIG. 21). At this moment $$K_{u1} = 14 I_m / 24 I_m = 0.5833. \quad (11)$$

At the same moment, a synchronizing mechanism starts operating, moving apart the rotor yoke halves synchronously in accordance with increasing the length and the cross-section of the stator winding turns. When the turning length increases by ⅓·$L_0$ and attains value $L_{W1}$=4/3·$L_0$ then the rotor magnets of the length $L_0$ will also move apart by ⅓·$L_0$ (as shown in FIG. 21) and cover only central buses with total current $I_\Sigma$=12$I_m$. At this moment $$K_{u2}=12/16=0.75=1.2857K_{u1}. \quad (12)$$

Simultaneously the first unit of synchronizing device assembly in each yoke half is comes into action, dropping (i.e., engaging in the magnetic circuit) the rotor magnet of the length $L_1$=$L_{W1}$=/6=1/6·4/3·$L_0$==0.0555 m. Thus, moving apart rotor yoke halves during the vehicular motion on the acceleration section we increase the propulsion force by 28%. By this time an additional space is released for dropping down the next mirror-symmetrical pair of the rotor magnets of length $L_2$=$L_{W2}$/6==0.074 m. It will happen when the stator winding turns attains value $L_{W2}$=4/3·$L_{W1}$=0.4445 m and so on until the vehicle speed attains its maximum value $V_{max}$=150 m/s. The length of the engaged magnets is determined by the formula $$L_i=2/9·L_0·(4/3)^{i-1}. \quad (13)$$

The total length $L_{\Sigma M}$ of all the magnets pertaining to one rotor pole (one rotor's half) and corresponding to the vehicular maximum speed equals 1 m.

Figure 22:
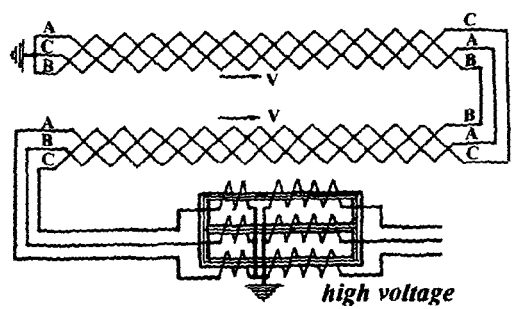

As it was said in [2] we see from FIG. 22 that in spite of currents in two halves of the stator winding run in opposite directions their traveling wave directions are the same. Therefore magnetic flux in any yoke cross-section is zero that allows to eliminate armature reaction of the rotor (FIG. 21).

Now we find the value of propulsion force $F_0$ at the starting point of an acceleration section. The length of traveling current wave $\lambda_0$ equals pole length of the rotor $\lambda_0$=2$L_0$=0.5 m. The total current in the working gap is: $I_{\Sigma 0}$=$k_i$·$\lambda_0$=37800 A. $k_i$ in this formula is determined as $k_i$=j·$\Delta$·$K_{u1}$·$k_t$, where j is permissible current density, $\Delta$ is thickness of the winding transverse segment buses, $K_{u1}$ is determined by (11), $k_t$ is the ratio of bus width to bus tooth pitch (FIG. 18-a) as was mentioned in the previous paragraph.

Then, the propulsion force is: $F_{p0}$=2$Bh_g I_{\Sigma 0}$=410 kG=0.41 tons

This force is able to produce initial acceleration that equals 0.4 m/s² to a vehicle of mass $m_v$=10000 kg.

It is worthwhile to remind that in order to increase the propulsion force it is necessary to ensure that the central part of a rotor's pole would coincide with the central part of the half-wave $\lambda$/2. As it was said, we can do this by simultaneously moving apart smoothly two rotor's yoke halves (by synchronizing mechanism) and gradually engaging rotor's magnets into operation (by synchronizing devices). It is obvious that engaging magnets gradually causes rapid change of propulsion force that leads to vehicle jolts. So to reduce the jolts, a coordinated work of the synchronizing mechanism and the synchronizing devices is required. It can be reached by following way: the synchronizing mechanism moves both rotor's halves apart slower than increasing the half-wave length. Then at the expense of lagging, some space appears for engaging the next pair of magnet units and so on until all the units will be switched on (FIG. 21). In addition the inertia plains jolts considerably.

A Physical Rotation Desk-Top Model for Measuring Destabilizing Forces, its Description and Mode of Operation The existing types of Maglev required long-term full-scale modeling. Originally working models of a vehicle and guideway were built with subsequent tests and measuring of stabilizing and destabilizing forces at different vehicular speeds resulted in choosing the working version of the system.

During the process of Amlev design the stage of full-scale modeling is completely eliminated. Process of modeling is maximally simplified, accelerated and becomes much cheaper because of analytical calculations and ability to build a small desk-top rotation model for measuring destabilizing forces acting on a flying vehicle at its shifts from an assigned trajectory that is presented here.

The simplified form of the magnetic unit structure (FIGS. 12 and 13) makes it possible to build a simple model with physical processes and forces $F_d$ and $F_s$ produced by these processes which are similar to those in the real Amlev. With this model the forces during its movement with any speed at any shift δ<g of the levitator can be easily and precisely measured. It is known that the force values of interaction between levitator's magnets moving with speed $V_v$ and immobile stator's cores will not change if, inversely, the magnets are immobile and the stator's cores move with the same speed $V_v$. Furthermore we substitute linear movement performed by steel stator's cores with respect to the immobile levitator's magnets with rotation of the stator's steel cores with respect to immobile parts of outer steel ring with magnets affixed to it (outer ring assembly). In this manner we will have a rotating model with stator cores inside, rotating within the immobile levitator. It is needless to say that to build such a model is much easier and cheaper than building a fragment of a working guideway with a vehicle moving along, not to mention that to measure forces acting on a moving vehicle is fraught with extreme difficulties.

Figure 23:
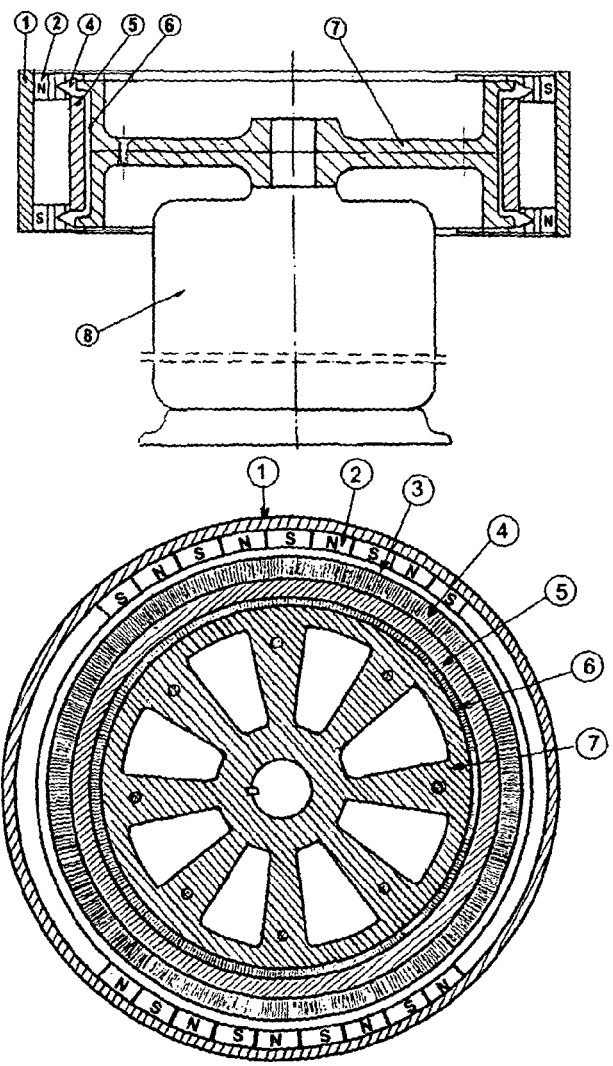

The proposed model comprises three parts:
a) a rotating internal ring imitating a guideway stator with saturated laminated steel cores covered by aluminum screens,
b) a non-rotating outer steel ring imitating a levitator with permanent magnets Crumax 355 of rectangular shape and alternating polarities—outer ring assembly
c) DC motor with ability to regulate rotor's speed from 2 to 35 turns per second (FIG. 23). At the diameter of the external ring equaled to 1,2 m, this corresponds to the rim speed of the internal part of the model 9.4 to 110 m/s.

It is necessary that the outer ring would permit free (without friction) horizontal shift $\Delta$ 1 to 6 mm along only one direction—along the diameter passing through the axis of rotation and bisecting points of the opposite central magnets (FIG. 23, bottom part).

For this purpose the outer ring is supplied with:
1. horizontal supports at three points of the ring with equal distances at 120° intervals;
2. vertical supports situated above that prevent rotation of the outer ring, but permit horizontal shift;
3. a system for applying and measuring horizontal (destabilizing $F_d$) and vertical (stabilizing $F_s$) forces.

During rotation of core backs (internal ring) the lines of the magnetic forces produced by the permanent magnets (outer ring) are crossing the core backs with the speed which grows as the DC motor picks up its rotation speed.

At the small horizontal shift δ of the outer ring assembly with affixed magnets to the right by 1 to 6 mm the air gap at the right side reduces by 1 to 6 mm while the air gap at the left side increases by 1 to 6 mm. Magnetic reluctances and magnetic fluxes $\Psi_{wL}$ and $\Psi_{wR}$ at the left and right sides will change respectively. Moreover $\Psi_{wL}$ will reduce, which leads to a reducing magnetic flux density in the left core backs, and consequently lowers their saturation and magnetic reluctance. Vice versa, $\Psi_{wR}$ will increase together with magnetic flux density in the right core backs, their saturation, and magnetic reluctance.

These changes in magnetic reluctances of the core backs opposite to changes in magnetic reluctances of the air gaps will essentially compensate them, thus reducing the difference of the magnetic fluxes $\Psi_{wR}-\Psi_{wL}$ and consequently destabilizing force $F_d$.

By carrying out a series of measurements for different values of shifts and then adjusting them to the real shifts of the Amlev vehicle we can evaluate stability of the vehicle along the entire trajectory of its flight. The physical processes and magnetic forces produced in the proposed model are similar to those in the real unit. To determine $F_s$ we have to do the same measurements for vertical shifts $\delta_v$ of the ring together with the magnets at different rotation speeds of the steel stator cores (internal ring). For the stabilizing forces it is easier to make accurate measurements on the real-scale single unit of FIGS. 12 and 13, however, the destabilizing forces are measurable on the above model only.

As it was said above, we have substituted the linear movement of the levitator with a rotational model, where the levitator is the immobile outer ring and the steel cores of the guideway is the moving internal ring. As we can see from FIG. 23, the model has eighteen pairs of magnets situated along the arc of the ring, perpendicular to the direction of its shift $\Delta$ (magnets situated on the side of the outer ring parallel to the direction of the shift $\Delta$ have almost no effect on the destabilizing force, and are thus not required). Therefore the forces of the interaction of each of the 18 pairs of magnets of the immobile ring with rotated cores are not parallel, but oriented towards the rotation center.

Let us assume that the radius of the external ring $R_R=0.6$ m, its thickness $t_R=0.03$ m, its width $w_R=0.3$ m, the length of each of 36 magnets Crumax 355 situated over the internal ring surface $l_M=0.1$ m, its thickness $t_M=0.027$ m, and its width $w_M=0.04$ m.

The points $\alpha_i$ at the centers of the adjacent magnets (to the right and left of the central magnet) are shifted by 10° from each other—respectively $\alpha_1=10°$ (cos 10°=0.9848), $\alpha_2=20°$ (cos 20°=0.9397), $\alpha_3=30°$ (cos 30°=0.866), $\alpha_4=40°$ (cos 40°=0.766). The air gap between the magnets and core tips is g (FIG. 23). If we shift the outer ring assembly to the right by $\Delta$ then the air gap between the central magnet ($\alpha_0$) and the corresponding core tip is $g-\Delta$ and at its opposite side the air gap is $g+\Delta$. The forces $f_i$ acting between each magnet and opposite core tip reduce in the direction to the right and to the left from the central magnet due to:

(a) increase of the air gap $(g-\Delta_i)$ (since $\Delta i$ reduces in a direction away from the central magnet);
(b) radial orientation of the forces ($f_i=f\cdot\cos\alpha_i$)

Vise versa, the values $f_i$ of the forces at the opposite side of outer ring-magnets assembly increase in the direction to the right and to the left of the central magnet due to the reduction of the air gap $(g+\Delta_i)$ and also because of their radial orientation.

Calculation of Real Forces

Our purpose now is to find an attraction force acting between the central magnet and the corresponding part of the opposite core tip. At zero shift it is indicated as f. Then at the shift $\Delta$ and minimum air gap $(g-\Delta)$ the attraction force will be $$f \cdot \frac{1}{g-\Delta}$$

and the sum force applied to all of the 18 magnets situated in two rows at right side of the ring $f_R$ can be expressed by:

$$f_R = 4f \cdot \left[\frac{1}{2(g-\Delta)} + \frac{\cos 10^0}{g-\Delta \cdot \cos 10^0} + \frac{\cos 20^0}{g-\Delta \cdot \cos 20^0} + \frac{\cos 30^0}{g-\Delta \cdot \cos 30^0} + \frac{\cos 40^0}{g-\Delta \cdot \cos 40^0}\right] \quad (14)$$

At the left side of the ring:

$$f_L = 4f \cdot \left[\frac{1}{2(g+\Delta)} + \frac{\cos 10^0}{g+\Delta \cdot \cos 10^0} + \frac{\cos 20^0}{g+\Delta \cdot \cos 20^0} + \frac{\cos 30^0}{g+\Delta \cdot \cos 30^0} + \frac{\cos 40^0}{g+\Delta \cdot \cos 40^0}\right] \quad (15)$$

The destabilizing force produced by all nine of the levitator's units at the shift $\Delta$ is $F_d=f_R-f_L$ and can be expressed by:

$$F_d = 4f \cdot \Delta \cdot \left[\frac{1}{g^2-\Delta^2} + \frac{2\cdot\cos 10^0}{g^2-\Delta^2 \cdot \cos 10^0} + \frac{2\cdot\cos 20^0}{g^2-\Delta^2 \cdot \cos 20^0} + \frac{2\cdot\cos 30^0}{g^2-\Delta^2 \cdot \cos 30^0} + \frac{2\cdot\cos 40^0}{g^2-\Delta^2 \cdot \cos 40^0}\right] \quad (16)$$

Substituting the known cos quantities into the above formula and indicating the expression in the brackets as $[\Sigma]$ we obtain the dependence of the destabilizing force on the values g and $\Delta$ as $F_d=4f\cdot\Delta\cdot[\Sigma]$ Setting values of g and $\Delta$ on the model, and then measuring $F_d$ we will obtain the attraction force f for one magnet. We then can find the lateral component of the destabilizing force $F_d$ along shift $\Delta$ if we multiply the force f by the quantity of the magnets pertaining to all the supporting units. The vertical component of the destabilizing force $F_{dz}$ can be found by multiplying the force f by the quantity of the magnets in all the guiding units.

At the shift of the ring assembly to the right by (1 to 6) mm the force acting on the right side of the ring will increase, meanwhile the force acting on the left side will decrease. In this case the difference of these forces acting on the whole ring equals to a destabilizing force arising in the unit of length 0.9 m at an assigned vehicle speed. On conversion to the total length of the all supporting units we obtain the destabilizing force applied to the whole vehicle at its shifts by (1 to 6) mm. The stabilizing force can also be calculated in similar manner by shifting up the outer ring assembly by (1 to 6) mm at different rotation speeds of DC current motor: (3 to 35) turns per sec.

Thus, by using the proposed model it is possible to determine stabilizing and destabilizing forces acting on a flying vehicle at any speed and at any point of its track during the designing stage of Amlev circumventing the stage of full-scale modeling.

REFERENCES

[1] Oleg V. Tozoni, "Magneto-dynamic levitation and stabilizing self-regulating system", U.S. Pat. No. 5,652,472, July 1997.
[2] Oleg V. Tozoni, "Linear synchronous motor with screening permanent magnet rotor with extendible poles", U.S. Pat. No. 5,717,261, February 1998.

[3] Oleg V. Tozoni, "New stable magnetodynamic suspension system", IEEE Transactions on Magnetics., vol. 35, no 2 pp. 1047-1054, March 1999.

[4] Oleg V. Tozoni, "Designing a Magnetodynamic Stable Suspension System", IEEE Transactions on Magnetics, vol. 35, No. 5, pp. 42684274, September. 1999.

[5] Oleg V. Tozoni, "Self-regulating Permanent Magnet Linear Motor", IEEE Transactions on Magnetics., vol. 35, no 4, pp. 2137-2145 July, 1999.

[6] Oleg V. Tozoni "AMLEV—a self-regulating version of Maglev", IEEE Transactions on Magnetics., vol. 37, no 6 pp. 3925-3933, November 2001.

[7] O. V. Tozoni "Mathematical Models for the evaluation of Electric and Magnetic fields", Gordon and Breach Science Publishers, New York, 1969, p. 34

[8] O. V. Tozoni "Method of secondary sources in electrical engineering", pp. 8-14, Energy, Moscow, USSR, 1975 (Russian).

[9] A. I. Knyaz "Information systems electrodynamics", pp. 346,361 (4.3), Radio and communication, Moscow, 1994 (Russian).

[10] A. M. Lyapunov, "Lectures in Theoretical Mechanics", Ukraine, Kiev, Naukova Durnka, McGraw-Hill Book Company, Inc., New York, 1983.

What I claim is:

1. A self-regulating magneto-dynamic system provided for magnetic levitation, stabilization and propulsion in a high speed ground transportation vehicle moving with high speed along a track having a predetermined trajectory, said system comprising:

a self-regulating Magneto-Dynamic Levitation and Stabilizing System (MDLSS) provided for magnetic levitation and stabilization of said vehicle; and a permanent magnet linear synchronous motor (PMLSM) provided for stable propulsion of said vehicle;

said MDLSS including a supporting unit for levitation and vertical stabilization of said vehicle, and a guiding unit for guidance and horizontal stabilization of said vehicle;

said supporting unit comprising:

a stator fixed to said track and a levitator fixed to a bottom of said vehicle and magnetically coupled to the stator and movable with respect thereto;

said stator of said first supporting unit including a pair of substantially identical elongated laminated first C-shaped steel cores each including a back and a first pair of substantially identical tips;

a cross-section of each of said first pair of tips of said supporting unit having a sharpened end thereon and a profile in the shape of an upper part of hyperbola;

the shape of said upper part of hyperbola of said first pair of tips provided to conform to magnetic flux lines during large downward deflection of said supporting unit from said stator, to increase magnetic field intensity and saturation of said first C-shaped steel core backs in order to maximize levitation;

said guiding unit comprising:

a stator fixed to said track and a levitator fixed to a side of said vehicle and magnetically coupled to the stator and movable with respect thereto;

said stator of said guiding unit including a pair of substantially identical elongated laminated second C-shaped steel cores each including a back and a second pair of substantially identical tips;

a cross-section of each of said second pair of tips of said guiding unit having a sharpened end thereon and a profile in the shape of hyperbola;

said shape of hyperbola of the said second pair of tips provided to conform to magnetic flux lines, to increase magnetic field intensity and saturation of said second C-shaped steel core backs in order to maximize horizontal stabilization;

said linear synchronous motor comprising a stator of variable winding turn lengths fixed to and extended along said track and a permanent magnet rotor fixed to said vehicle and movable with respect to said linear stator;

said permanent magnet rotor comprising two opposite symmetrical pole-pitches movable relative to each other;

each pole-pitch including a number of magnetic units of different length positioned in a row along said vehicle;

a central magnetic unit of each of said pole-pitches being a first unit starting from a center of said rotor;

the rest of said magnetic units increasing in length counting from said central units;

the length of each of the rest of said magnetic units being equal to:

$$L_i 2/9 L_0 (4/3)^{i-1},$$

Wherein i being the count of the rest of said magnetic units from said central magnetic unit, and $L_0$ being a length of central magnet.

2. The self-regulating magneto-dynamic system of claim 1, wherein said supporting unit and said guiding unit comprising four permanent magnets connected by rigid ties and positioned in two levels with two permanent magnets of the same polarity in each level, respective permanent magnets in said two levels positioned one under another being of opposite polarity, the permanent magnets having substantially identical rectangular cross-section;

a distance between said sharpened ends of said tips of each of said cores substantially equal to a distance between middle points of said permanent magnets positioned in each of said two levels;

said permanent magnets disposed in the air gap existing between said tips of said cores of said guiding unit and said supporting unit.

3. The self-regulating magneto-dynamic system of claim 1, wherein each of said first and second laminated C-shaped steel cores includes a non-magnetic conductive screen in the form of a flat strip of non-magnetic conductive material for suppressing leakage flux and increasing magnetic saturation of said C-shaped steel core backs.

4. The self-regulating magneto-dynamic system of claim 1, wherein said stator includes a one-fold stator winding with a plurality of mirror-symmetrical turns having different length along said track and powered with three-phase alternating current of constant frequency;

wherein each of said turns of said stator winding includes four vertical working segments, two horizontal and two longitudinal segments;

wherein said vertical and horizontal segments form layers of conductors; and wherein said longitudinal segments of all the winding turns form two symmetrical facing bars as a monolithic multilayer of conductors agglutinated to one another by electrical insulation;

wherein a number of said longitudinal segments of each facing bar varies from 8 to 11;

wherein said facing bars are freely inserted in two symmetrical hollows of said rotor.

* * * * *